US007016971B1

(12) United States Patent
Recio et al.

(10) Patent No.: US 7,016,971 B1
(45) Date of Patent: Mar. 21, 2006

(54) CONGESTION MANAGEMENT IN A DISTRIBUTED COMPUTER SYSTEM MULTIPLYING CURRENT VARIABLE INJECTION RATE WITH A CONSTANT TO SET NEW VARIABLE INJECTION RATE AT SOURCE NODE

(75) Inventors: Renato J. Recio, Austin, TX (US); David J. Garcia, Los Gatos, CA (US); Michael R. Krause, Boulder Creek, CA (US); Patricia A. Thaler, Carmichael, CA (US); John C. Krause, Georgetown, TX (US)

(73) Assignees: Hewlett-Packard Company, Palo Alto, CA (US); IBM Corporation, Armonk, NY (US); Compaq Computer Corporation, Houston, TX (US); Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/980,760

(22) PCT Filed: May 24, 2000

(86) PCT No.: PCT/US00/14294

§ 371 (c)(1),
(2), (4) Date: Apr. 15, 2002

(87) PCT Pub. No.: WO00/72169

PCT Pub. Date: Nov. 30, 2000

Related U.S. Application Data

(60) Provisional application No. 60/135,664, filed on May 24, 1999, provisional application No. 60/154,150, filed on Sep. 15, 1999.

(51) Int. Cl.
*G06F 15/16* (2006.01)

(52) U.S. Cl. .................................. 709/233; 709/234
(58) Field of Classification Search ........ 709/232–235, 709/8, 237; 370/232, 231
See application file for complete search history.

(56) References Cited

U.S. PATENT DOCUMENTS

| 4,475,192 | A |   | 10/1984 | Fernow et al. |
|-----------|---|---|---------|---------------|
| 5,063,562 | A | * | 11/1991 | Barzilai et al. .............. 370/231 |
| 5,193,151 | A | * | 3/1993  | Jain .......................... 709/237 |
| 5,313,454 | A | * | 5/1994  | Bustini et al. .............. 370/231 |
| 5,506,964 | A |   | 4/1996  | Beukema |
| 5,701,292 | A | * | 12/1997 | Chiussi et al. .............. 370/232 |
| 5,734,653 | A |   | 3/1998  | Hiraiwa et al. |
| 5,734,825 | A | * | 3/1998  | Lauck et al. ................ 709/233 |
| 5,802,051 | A |   | 9/1998  | Petersen et al. |
| 5,802,295 | A |   | 9/1998  | Fukui et al. |
| 5,812,527 | A |   | 9/1998  | Kline et al. |
| 5,987,506 | A |   | 11/1999 | Carter et al. |
| 6,026,448 | A |   | 2/2000  | Goldrian et al. |
| 6,047,323 | A |   | 4/2000  | Krause |

(Continued)

OTHER PUBLICATIONS

Brakmo, Lawrence S. et al., "TCP Vegas: End to End Congestion Avoidance on a Global Internet," IEEE Journal on Selected Areas in Communications, vol. 13, No. 8, pp. 1465-1480 (Oct. 1995).

(Continued)

*Primary Examiner*—Le Hien Luu

(57) ABSTRACT

A distributed computer system includes links and routing devices coupled between the links and routing frames between the links. Each of the routing devices includes a congestion control mechanism for detecting congestion at the routing device and responding to detected congestion by gradually reducing an injection rate of frames routed from the routing device.

23 Claims, 12 Drawing Sheets

U.S. PATENT DOCUMENTS

| | | |
|---|---|---|
| 6,088,736 A | 7/2000 | Manning et al. |
| 6,286,052 B1 | 9/2001 | McCloghrie et al. |
| 6,434,624 B1 | 8/2002 | Gai et al. |

OTHER PUBLICATIONS

Cisco Systems, Inc., "Optimizing Your Network Design," Macmillan Publishing USA, pp. 1-23, (1999). <www.cisco.com>.

Elloumi, Omar et al., "Improving Congestion Avoidance Algorithms for Asymmetric Networks," IEEE, pp. 1417-1421 (1997).

Henderson, Thomas R. et al., "On Improving the Fairness of TCP Congestion Avoidance," IEEE, pp. 539-544 (1998).

IBM Corp., "Direct Memory Access Tag Architecture," IBM Technical Disclosure Bulletin, vol. 32, No 4B, pp. 143-151 (Sep. 1989).

Kim, Jin-Ho et al., "TCP Deadlock Due to Coarse Timer Granularities in Unix-Based Systems," Electronic Letters, vol. 35, No. 14, (Jul. 8, 1999).

Misra, Archan et al., "The Window Distribution of Idealized TCP Congestion Avoidance with Variable Packet Loss," IEEE, pp. 1564-1572 (1999).

Moldeklev, Kjersti et al., "How a Large ATM MTU Causes Deadlocks in TCP Data Transfers," IEEE/ACM Transactions on Networking, vol. 3, No. 4, pp. 409-422 (Aug. 1995).

Parsa, Christina et al., "Improving TCP Congestion Control over Internets with Hetergeneous Transmission Media," IEEE Computer Society, Seventh International Conference on Network Protocols (ICNP'99), pp. 213-221 (Oct. 31-Nov. 3, 1999).

Ren, Jing-Fei et al., "Flow Control and Congestion Avoidance in Switched Ethernet LANs," IEEE, pp. 508-512 (1997).

Rohrs, Charles E. et al., "A Control Engineer's Look at ATM Congestion Avoidance," IEEE, pp. 1089-1094 (1995).

Rosenberg, Jonathan et al., "Timer Reconsideration for Enhanced RTP Scalability," IEEE, pp. 233-241 (1998).

"Congestion Avoidance Overview," pp. QC-69-QC76.

"Weighted Random Early Detection on the Cisco 12000 Series Router," pp. 1-26.

* cited by examiner

CONGESTION MANAGEMENT IN A DISTRIBUTED COMPUTER SYSTEM MULTIPLYING CURRENT VARIABLE INJECTION RATE WITH A CONSTANT TO SET NEW VARIABLE INJECTION RATE AT SOURCE NODE

This application claims the benefit of 60/135,664, filed May 24, 1999 and claims the benefit of 60/154,150, filed Sep. 15, 1999.

THE FIELD OF THE INVENTION

The present invention generally relates to communication in distributed computer systems and more particularly to congestion management in distributed computer systems.

BACKGROUND OF THE INVENTION

In conventional distributed computer systems, distributed processes, which are on different nodes in the distributed computer system, typically employ transport services, to communicate. A source process on a first node communicates messages to a destination process on a second node via a transport service. A message is herein defined to be an application-defined unit of data exchange, which is a primitive unit of communication between cooperating sequential processes. Messages are typically packetized into frames for communication on an underlying communication services/fabrics. A frame is herein defined to be one unit of data encapsulated by a physical network protocol header and/or trailer.

Messages communicated over the underlying communication services/fabrics can often experience congestion for various reasons, such as head of line blocking. There are conventional congestion control mechanisms. Congestion control mechanisms typically fall into three categories which include congestion detection mechanisms; congestion reporting mechanisms; and congestion response mechanisms. Congestion reporting mechanisms report the occurrence of congestion provided from congestion detection mechanisms possibly for short term use in alleviating congestion and possibly for long term network management. The congestion response mechanisms attempt to alleviate or remove congestion. Congestion in large distributed computer systems is a significant problem today, especially in infrastructures of remote computer systems having congestion resulting from message traffic over an internet or intranet coupling the remote computer systems.

For reasons stated above and for other reasons presented in greater detail in the Description of the Preferred Embodiments section of the present specification, there is a need for an improved congestion management architecture for distributed computer systems to alleviate congestion problems in the distributed computer systems resulting from communicating messages between remote processes over the underlying communication services/fabrics. Such an improved congestion management architecture should provide congestion detection mechanisms; congestion reporting mechanisms; and congestion response mechanisms which efficiently operate together to better address congestion problems encountered today in infrastructures of remote computer systems connected by an internet or an intranet.

SUMMARY OF THE INVENTION

The present invention provides a distributed computer system having links and routing devices. The routing devices are coupled between the links and route frames between the links. Each of the routing devices includes a congestion control mechanism for detecting congestion at the routing device and responding to detected congestion by gradually reducing an injection rate of frames routed from the routing device.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
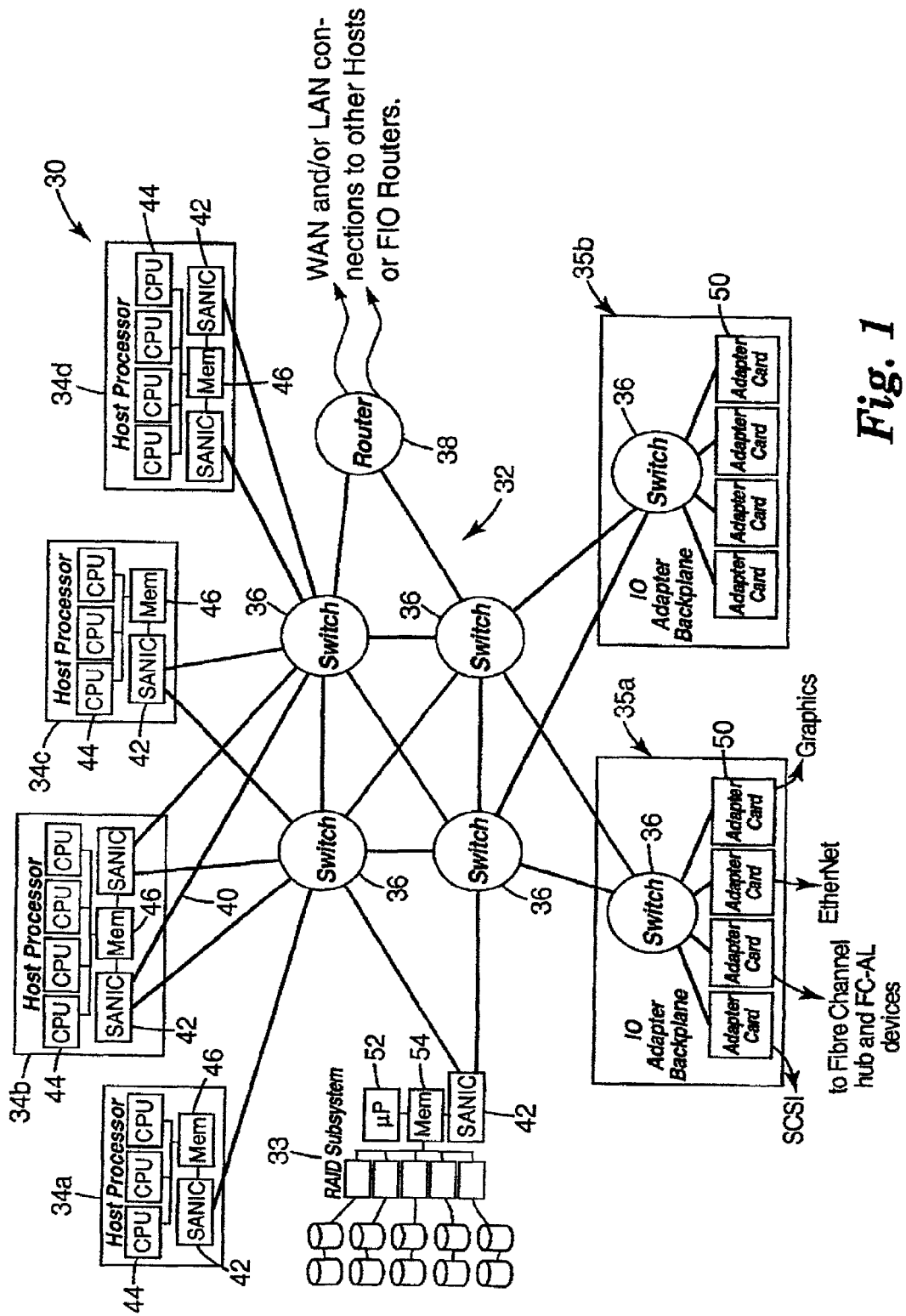
FIG. 1 is a diagram of a distributed computer system for implementing the present invention.

An example embodiment of a distributed computer system is illustrated generally at 30 in FIG. 1. Distributed computer system 30 is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an internet or intranet.

Distributed computer system 30 includes a system area network (SAN) 32 which is a high-bandwidth, low-latency network interconnecting nodes within distributed computer system 30. A node is herein defined to be any device attached to one or more links of a network and forming the origin and/or destination of messages within the network. In the example distributed computer system 30, nodes include host processors 34a–34d; redundant array independent disk (RAID) subsystem 33; and I/O adapters 35a and 35b. The nodes illustrated in FIG. 1 are for illustrative purposes only, as SAN 32 can connect any number and any type of independent processor nodes, I/O adapter nodes, and I/O device nodes. Any one of the nodes can function as an endnode, which is herein defined to be a device that originates or finally consumes messages or frames in the distributed computer system.

A message is herein defined to be an application-defined unit of data exchange, which is a primitive unit of communication between cooperating sequential processes. A frame is herein defined to be one unit of data encapsulated by a physical network protocol header and/or trailer. The header generally provides control and routing information for directing the frame through SAN 32. The trailer generally contains control and cyclic redundancy check (CRC) data for ensuring packets are not delivered with corrupted contents.

SAN 32 is the communications and management infrastructure supporting both I/O and interprocess communication (IPC) within distributed computer system 30. SAN 32 includes a switched communications fabric (SAN FABRIC) allowing many devices to concurrently transfer data with high-bandwidth and low latency in a secure, remotely managed environment. Endnodes can communicate over multiple ports and utilize multiple paths through the SAN fabric. The multiple ports and paths through SAN 32 can be employed for fault tolerance and increased bandwidth data transfers.

SAN 32 includes switches 36 and routers 38. A switch is herein defined to be a device that connects multiple links 40 together and allows routing of frames from one link 40 to another link 40 within a subnet using a small header destination ID field. A router is herein defined to be a device that connects multiple links 40 together and is capable of routing frames from one link 40 in a first subnet to another link 40 in a second subnet using a large header destination address or source address.

In one embodiment, a link 40 is a full duplex channel between any two network fabric elements, such as endnodes, switches 36, or routers 38. Example suitable links 40 include, but are not limited to, copper cables, optical cables, and printed circuit copper traces on backplanes and printed circuit boards.

Endnodes, such as host processor endnodes 34 and I/O adapter endnodes 35, generate request frames and return acknowledgment frames. By contrast, switches 36 and routers 38 do not generate and consume frames. Switches 36 and routers 38 simply pass frames along. In the case of switches 36, the frames are passed along unmodified. For routers 38, the network header is modified slightly when the frame is routed. Endnodes, switches 36, and routers 38 are collectively referred to as end stations.

In distributed computer system 30, host processor nodes 34a–34d and RAID subsystem node 33 include at least one system area network interface controller (SANIC) 42. In one embodiment, each SANIC 42 is an endpoint that implements the SAN 32 interface in sufficient detail to source or sink frames transmitted on the SAN fabric. The SANICs 42 provide an interface to the host processors and I/O devices. In one embodiment the SANIC is implemented in hardware. In this SANIC hardware implementation, the SANIC hardware offloads much of CPU and I/O adapter communication overhead. This hardware implementation of the SANIC also permits multiple concurrent communications over a switched network without the traditional overhead associated with communicating protocols. In one embodiment, SAN 32 provides the I/O and IPC clients of distributed computer system 30 zero processor-copy data transfers without involving the operating system kernel process, and employs hardware to provide reliable, fault tolerant communications.

As indicated in FIG. 1, router 38 is coupled to wide area network (WAN) and/or local area network (LAN) connections to other hosts or other routers 38.

The host processors 34a–34d include central processing units (CPUs) 44 and memory 46.

I/O adapters 35a and 35b include an I/O adapter backplane 48 and multiple I/O adapter cards 50. Example adapter cards 50 illustrated in FIG. 1 include an SCSI adapter card; an adapter card to fiber channel hub and FC-AL devices; an Ethernet adapter card; and a graphics adapter card. Any known type of adapter card can be implemented. I/O adapters 35a and 35b also include a switch 36 in the I/O adapter backplane 48 to couple the adapter cards 50 to the SAN 32 fabric.

RAID subsystem 33 includes a microprocessor 52, memory 54, read/write circuitry 56, and multiple redundant storage disks 58.

SAN 32 handles data communications for I/O and IPC in distributed computer system 30. SAN 32 supports high-bandwidth and scalability required for I/O and also supports the extremely low latency and low CPU overhead required for IPC. User clients can bypass the operating system kernel process and directly access network communication hardware, such as SANICs 42 which enable efficient message passing protocols. SAN 32 is suited to current computing models and is a building block for new forms of I/O and computer cluster communication. SAN 32 allows I/O adapter nodes to communicate among themselves or communicate with any or all of the processor nodes in distributed computer system 30. With an I/O adapter attached to SAN 32, the resulting I/O adapter node has substantially the same communication capability as any processor node in distributed computer system 30.

Channel and Memory Semantics

In one embodiment, SAN 32 supports channel semantics and memory semantics. Channel semantics is sometimes referred to as send/receive or push communication operations, and is the type of communications employed in a traditional I/O channel where a source device pushes data and a destination device determines the final destination of the data. In channel semantics, the frame transmitted from a source process specifies a destination processes' communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved with the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for I/O and IPC. A typical I/O operation employs a combination of channel and memory semantics. In an illustrative example I/O operation of distributed computer system 30, host processor 34a initiates an I/O operation by using channel semantics to send a disk write command to I/O adapter 35b. I/O adapter 35b examines the command and uses memory semantics to read the data buffer directly from the memory space of host processor 34a. After the data buffer is read, I/O adapter 35b employs channel semantics to push an I/O completion message back to host processor 34a.

In one embodiment, distributed computer system 30 performs operations that employ virtual addresses and virtual memory protection mechanisms to ensure correct and proper access to all memory. In one embodiment, applications running in distributed computed system 30 are not required to use physical addressing for any operations.

Queue Pairs

Figure 2:
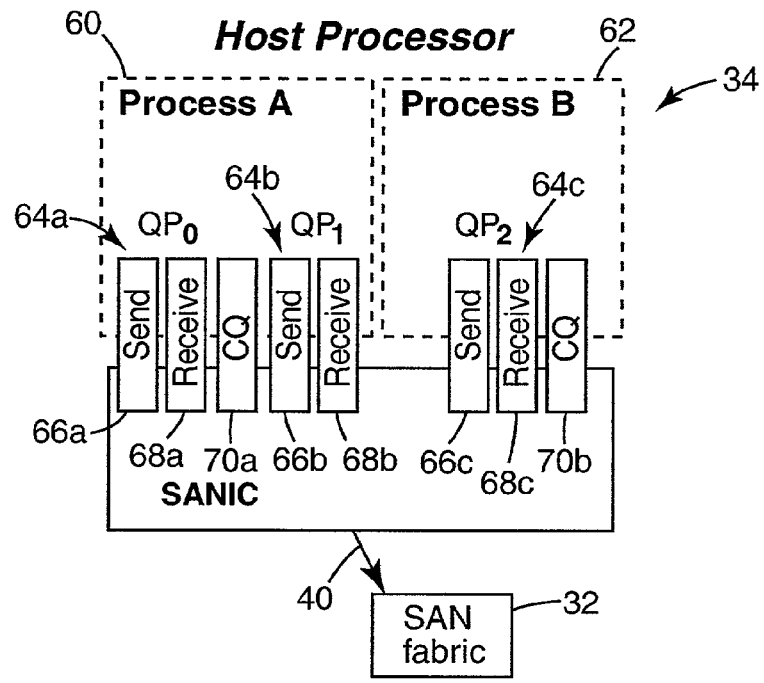
FIG. 2 is a diagram of an example host processor node for the computer system of FIG. 1.

An example host processor node 34 is generally illustrated in FIG. 2. Host processor node 34 includes a process A indicated at 60 and a process B indicated at 62. Host processor node 34 includes SANIC 42. Host processor node 34 also includes queue pairs (QP's) 64a and 64b which provide communication between process 60 and SANIC 42. Host processor node 34 also includes QP 64c which provides communication between process 62 and SANIC 42. A single SANIC, such as SANIC 42 in a host processor 34, can support thousands of QPs. By contrast, a SAN interface in an I/O adapter 35 typically supports less than ten QPs.

Each QP 64 includes a send work queue 66 and a receive work queue 68. A process, such as processes 60 and 62, calls an operating-system specific programming interface which is herein referred to as verbs, which place work items, referred to as work queue elements (WQEs) onto a QP 64. A WQE is executed by hardware in SANIC 42. SANIC 42 is coupled to SAN 32 via physical link 40. Send work queue 66 contains WQEs that describe data to be transmitted on the SAN 32 fabric. Receive work queue 68 contains WQEs that describe where to place incoming data from the SAN 32 fabric.

Host processor node 34 also includes completion queue 70a interfacing with process 60 and completion queue 70b interfacing with process 62. The completion queues 70 contain information about completed WQEs. The completion queues are employed to create a single point of completion notification for multiple QPs. A completion queue entry is a data structure on a completion queue 70 that describes a completed WQE. The completion queue entry contains sufficient information to determine the QP that holds the completed WQE. A completion queue context is a block of information that contains pointers to, length, and other information needed to manage the individual completion queues.

Example WQEs include work items that initiate data communications employing channel semantics or memory semantics; work items that are instructions to hardware in SANIC 42 to set or alter remote memory access protections; and work items to delay the execution of subsequent WQEs posted in the same send work queue 66.

More specifically, example WQEs supported for send work queues 66 are as follows. A send buffer WQE is a channel semantic operation to push a local buffer to a remote QP's receive buffer. The send buffer WQE includes a gather list to combine several virtual contiguous local buffers into a single message that is pushed to a remote QP's receive buffer. The local buffer virtual addresses are in the address space of the process that created the local QP.

A remote direct memory access (RDMA) read WQE provides a memory semantic operation to read a virtually contiguous buffer on a remote node. The RDMA read WQE reads a virtually contiguous buffer on a remote endnode and writes the data to a virtually contiguous local memory buffer. Similar to the send buffer WQE, the local buffer for the RDMA read WQE is in the address space of the process that created the local QP. The remote buffer is in the virtual address space of the process owning the remote QP targeted by the RDMA read WQE.

A RDMA write WQE provides a memory semantic operation to write a virtually contiguous buffer on a remote node. The RDMA write WQE contains a scatter list of locally virtually contiguous buffers and the virtual address of the remote buffer into which the local buffers are written.

A RDMA FetchOp WQE provides a memory semantic operation to perform an atomic operation on a remote word. The RDMA FetchOp WQE is a combined RDMA read, modify, and RDMA write operation. The RDMA FetchOp WQE can support several read-modify-write operations, such as Compare and Swap if equal.

A bind/unbind remote access key (RKey) WQE provides a command to SANIC hardware to modify the association of a RKey with a local virtually contiguous buffer. The RKey is part of each RDMA access and is used to validate that the remote process has permitted access to the buffer.

A delay WQE provides a command to SANIC hardware to delay processing of the QP's WQEs for a specific time interval. The delay WQE permits a process to meter the flow of operations into the SAN fabric.

In one embodiment, receive queues 68 only support one type of WQE, which is referred to as a receive buffer WQE. The receive buffer WQE provides a channel semantic operation describing a local buffer into which incoming send messages are written. The receive buffer WQE includes a scatter list describing several virtually contiguous local buffers. An incoming send message is written to these buffers. The buffer virtual addresses are in the address space of the process that created the local QP.

For IPC, a user-mode software process transfers data through QPs 64 directly from where the buffer resides in memory. In one embodiment, the transfer through the QPs bypasses the operating system and consumes few host instruction cycles. QPs 64 permit zero processor-copy data transfer with no operating system kernel involvement. The zero processor-copy data transfer provides for efficient support of high-bandwidth and low-latency communication.

Transport Services

When a QP 64 is created, the QP is set to provide a selected type of transport service. In one embodiment, a distributed computer system implementing the present invention supports four types of transport services.

Figure 3:
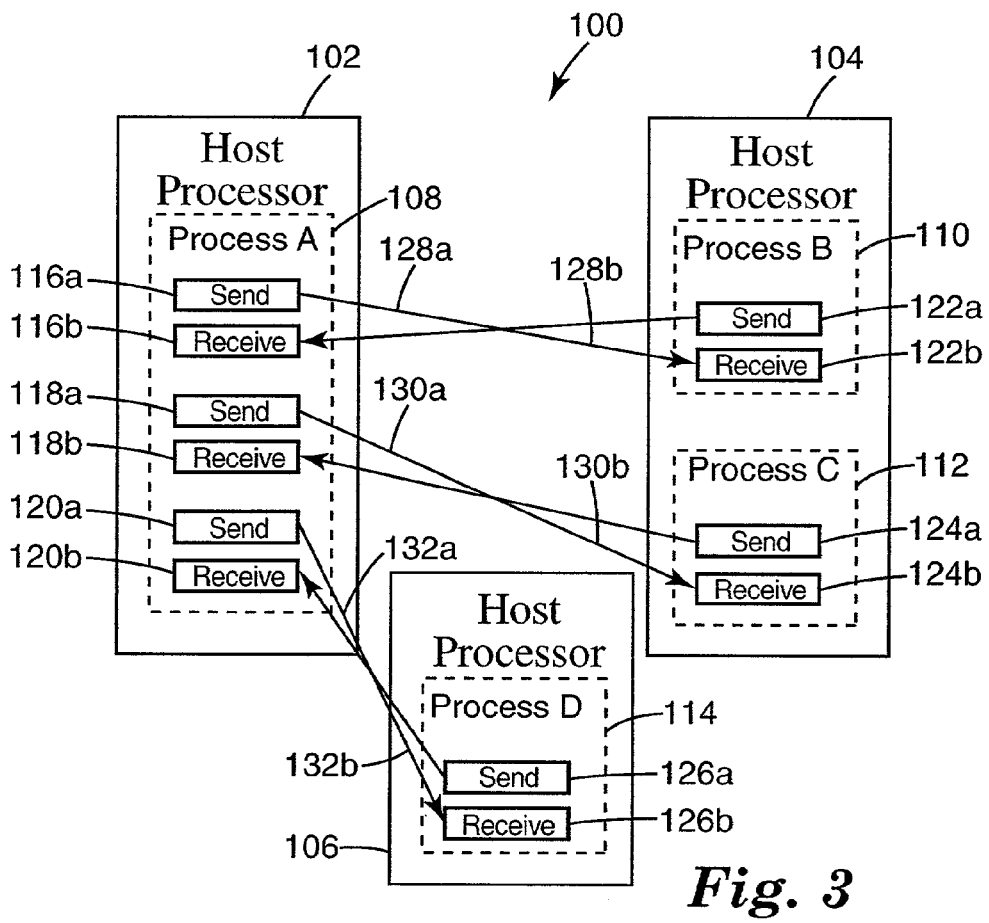
FIG. 3 is a diagram of a portion of a distributed computer system employing a reliable connection service to communicate between distributed processes.

A portion of a distributed computer system employing a reliable connection service to communicate between distributed processes is illustrated generally at 100 in FIG. 3. Distributed computer system 100 includes a host processor node 102, a host processor node 104, and a host processor node 106. Host processor node 102 includes a process A indicated at 108. Host processor node 104 includes a process B indicated at 110 and a process C indicated at 112. Host processor node 106 includes a process D indicated at 114.

Host processor node 102 includes a QP 116 having a send work queue 116a and a receive work queue 116b; a QP 118 having a send work queue 118a and receive work queue 118b; and a QP 120 having a send work queue 120a and a receive work queue 120b which facilitate communication to and from process A indicated at 108. Host processor node 104 includes a QP 122 having a send work queue 122a and receive work queue 122b for facilitating communication to and from process B indicated at 110. Host processor node 104 includes a QP 124 having a send work queue 124a and receive work queue 124b for facilitating communication to and from process C indicated at 112. Host processor node 106 includes a QP 126 having a send work queue 126a and receive work queue 126b for facilitating communication to and from process D indicated at 114.

The reliable connection service of distributed computer system 100 associates a local QP with one and only one remote QP. Thus, QP 116 is connected to QP 122 via a non-sharable resource connection 128 having a non-sharable resource connection 128a from send work queue 116a to receive work queue 122b and a non-sharable resource connection 128b from send work queue 122a to receive work queue 116b. QP 118 is connected to QP 124 via a non-sharable resource connection 130 having a non-sharable resource connection 130a from send work queue 118a to receive work queue 124b and a non-sharable resource connection 130b from send work queue 124a to receive work queue 118b. QP 120 is connected to QP 126 via a non-sharable resource connection 132 having a non-sharable resource connection 132a from send work queue 120a to receive work queue 126b and a non-sharable resource connection 132b from send work queue 126a to receive work queue 120b.

A send buffer WQE placed on one QP in a reliable connection service causes data to be written into the receive buffer of the connected QP. RDMA operations operate on the address space of the connected QP.

The reliable connection service requires a process to create a QP for each process which is to communicate with over the SAN fabric. Thus, if each of N host processor nodes contain M processes, and all M processes on each node wish to communicate with all the processes on all the other nodes, each host processor node requires $M^2 \times (N-1)$ QPs. Moreover, a process can connect a QP to another QP on the same SANIC.

In one embodiment, the reliable connection service is made reliable because hardware maintains sequence numbers and acknowledges all frame transfers. A combination of hardware and SAN driver software retries any failed communications. The process client of the QP obtains reliable communications even in the presence of bit errors, receive buffer underruns, and network congestion. If alternative paths exist in the SAN fabric, reliable communications can be maintained even in the presence of failures of fabric switches or links.

In one embodiment, acknowledgements are employed to deliver data reliably across the SAN fabric. In one embodiment, the acknowledgement is not a process level acknowledgment, because the acknowledgment does not validate the receiving process has consumed the data. Rather, the acknowledgment only indicates that the data has reached its destination.

Figure 4:
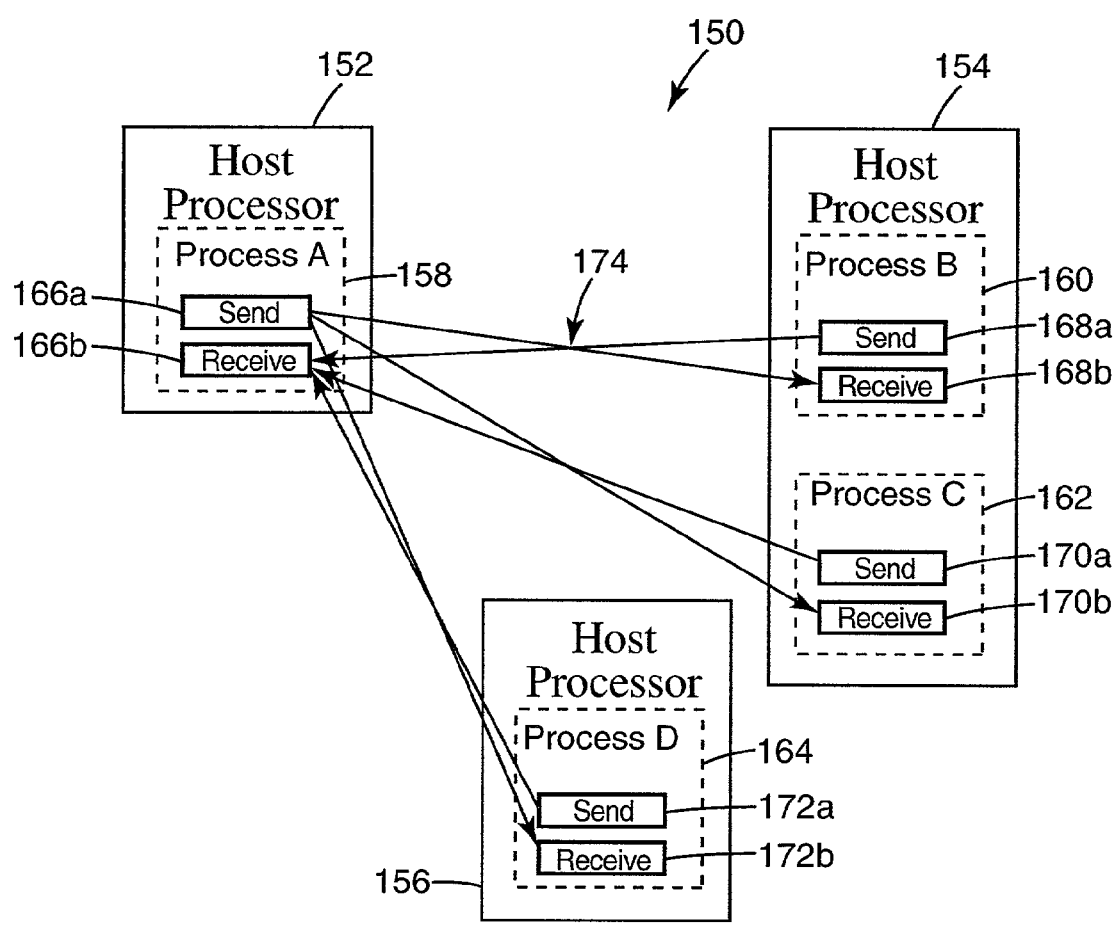
FIG. 4 is a diagram of a portion of distributed computer system employing a reliable datagram service to communicate between distributed processes.

A portion of a distributed computer system employing a reliable datagram service to communicate between distributed processes is illustrated generally at 150 in FIG. 4. Distributed computer system 150 includes a host processor node 152, a host processor node 154, and a host processor node 156. Host processor node 152 includes a process A indicated at 158. Host processor node 154 includes a process B indicated at 160 and a process C indicated at 162. Host processor node 156 includes a process D indicated at 164.

Host processor node 152 includes QP 166 having send work queue 166a and receive work queue 166b for facilitating communication to and from process A indicated at 158. Host processor node 154 includes QP 168 having send work queue 168a and receive work queue 168b for facilitating communication from and to process B indicated at 160. Host processor node 154 includes QP 170 having send work queue 170a and receive work queue 170b for facilitating communication from and to process C indicated at 162. Host processor node 156 includes QP 172 having send work queue 172a and receive work queue 172b for facilitating communication from and to process D indicated at 164. In the reliable datagram service implemented in distributed computer system 150, the QPs are coupled in what is referred to as a connectionless transport service.

For example, a reliable datagram service 174 couples QP 166 to QPs 168, 170, and 172. Specifically, reliable datagram service 174 couples send work queue 166a to receive work queues 168b, 170b, and 172b. Reliable datagram service 174 also couples send work queues 168a, 170a, and 172a to receive work queue 166b.

The reliable datagram service permits a client process of one QP to communicate with any other QP on any other remote node. At a receive work queue, the reliable datagram service permits incoming messages from any send work queue on any other remote node.

In one embodiment, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless QPs communicating between a pair of endnodes. Each endnode requires at least one EE context for every endnode it wishes to communicate with in the reliable datagram service (e.g., a given endnode requires at least N EE contexts to be able to have reliable datagram service with N other endnodes).

The reliable datagram service greatly improves scalability because the reliable datagram service is connectionless. Therefore, an endnode with a fixed number of QPs can communicate with far more processes and endnodes with a reliable datagram service than with a reliable connection transport service. For example, if each of N host processor nodes contain M processes, and all M processes on each node wish to communicate with all the processes on all the other nodes, the reliable connection service requires $M^2 \times$ (N×1) QPs on each node. By comparison, the connectionless reliable datagram service only requires M QPs+(N−1) EE contexts on each node for exactly the same communications.

A third type of transport service for providing communications is a unreliable datagram service. Similar to the reliable datagram service, the unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

A fourth type of transport service is referred to as raw datagram service and is technically not a transport service. The raw datagram service permits a QP to send and to receive raw datagram frames. The raw datagram mode of operation of a QP is entirely controlled by software. The raw datagram mode of the QP is primarily intended to allow easy interfacing with traditional internet protocol, version 6 (IPv6) LAN-WAN networks, and further allows the SANIC to be used with full software protocol stacks to access transmission control protocol (TCP), user datagram protocol (UDP), and other standard communication protocols. Essentially, in the raw datagram service, SANIC hardware generates and consumes standard protocols layered on top of IPv6, such as TCP and UDP. The frame header can be mapped directly to and from an IPv6 header. Native IPv6 frames can be bridged into the SAN fabric and delivered directly to a QP to allow a client process to support any transport protocol running on top of IPv6. A client process can register with SANIC hardware in order to direct datagrams for a particular upper level protocol (e.g., TCP and UDP) to a particular QP. SANIC hardware can demultiplex incoming IPv6 streams of datagrams based on a next header field as well as the destination IP address.

SANIC and I/O Adapter Endnodes

Figure 5:
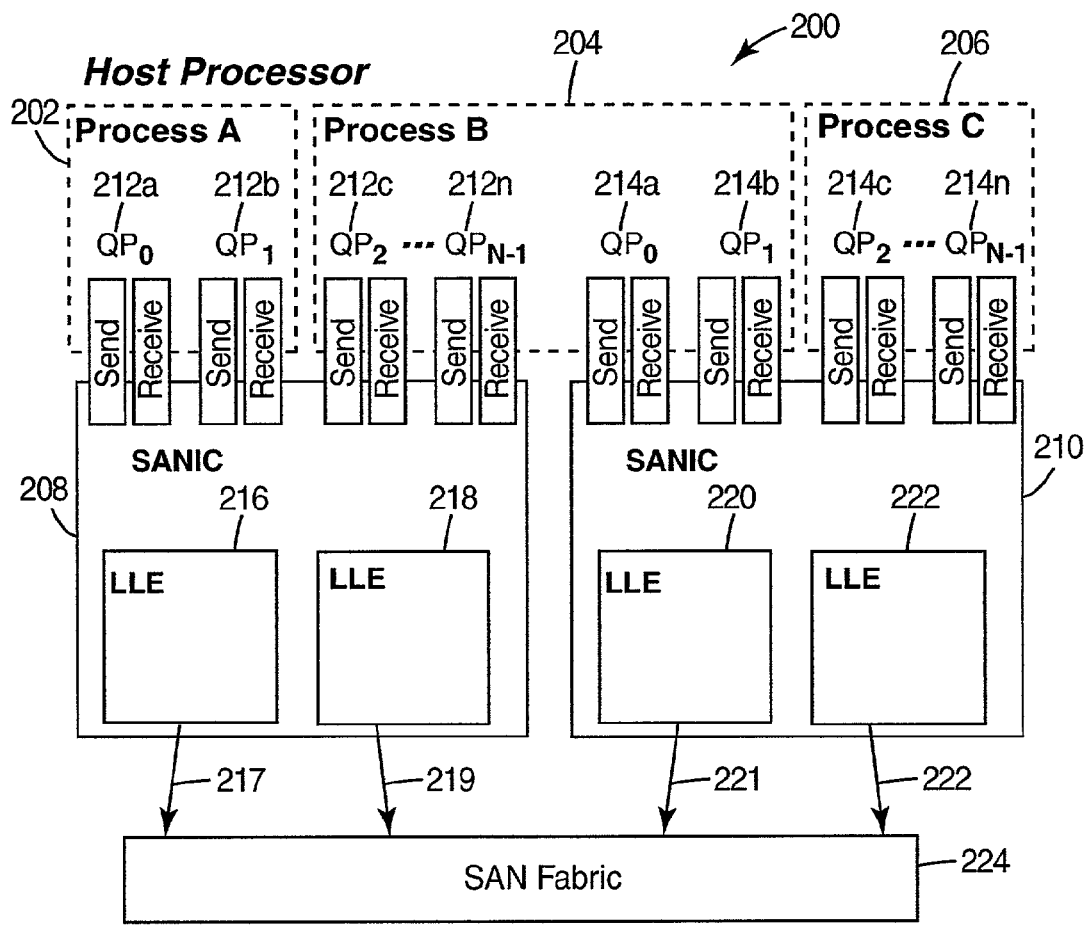
FIG. 5 is a diagram of an example host processor node for operation in a distributed computer system implementing the present invention.

An example host processor node is generally illustrated at 200 in FIG. 5. Host processor node 200 includes a process A indicated at 202, a process B indicated at 204, and a process C indicated at 206. Host processor 200 includes a SANIC 208 and a SANIC 210. As discussed above, a host processor endnode or an I/O adapter endnode can have one or more SANICs. SANIC 208 includes a SAN link level engine (LLE) 216 for communicating with SAN fabric 224 via link 217 and an LLE 218 for communicating with SAN fabric 224 via link 219. SANIC 210 includes an LLE 220 for communicating with SAN fabric 224 via link 221 and an LLE 222 for communicating with SAN fabric 224 via link 223. SANIC 208 communicates with process A indicated at 202 via QPs 212a and 212b. SANIC 208 communicates with process B indicated at 204 via QPs 212c–212n. Thus, SANIC 208 includes N QPs for communicating with processes A and B. SANIC 210 includes QPs 214a and 214b for communicating with process B indicated at 204. SANIC 210 includes QPs 214c–214n for communicating with process C indicated at 206. Thus, SANIC 210 includes N QPs for communicating with processes B and C.

An LLE runs link level protocols to couple a given SANIC to the SAN fabric. RDMA traffic generated by a SANIC can simultaneously employ multiple LLEs within the SANIC which permits striping across LLEs. Striping refers to the dynamic sending of frames within a single message to an endnode's QP through multiple fabric paths. Striping across LLEs increases the bandwidth for a single QP as well as provides multiple fault tolerant paths. Striping also decreases the latency for message transfers. In one embodiment, multiple LLEs in a SANIC are not visible to the client process generating message requests. When a host processor includes multiple SANICs, the client process must explicitly move data on the two SANICs in order to gain parallelism. A single QP cannot be shared by SANICS. Instead a QP is owned by one local SANIC.

The following is an example naming scheme for naming and identifying endnodes in one embodiment of a distributed computer system according to the present invention. A host name provides a logical identification for a host node, such as a host processor node or I/O adapter node. The host name identifies the endpoint for messages such that messages are destine for processes residing on an endnode specified by the host name. Thus, there is one host name per node, but a node can have multiple SANICs.

A globally unique ID (GUID) identifies a transport endpoint. A transport endpoint is the device supporting the transport QPs. There is one GUID associated with each SANIC.

A local ID refers to a short address ID used to identify a SANIC within a single subnet. In one example embodiment, a subnet has up $2^{16}$ endnodes, switches, and routers, and the local ID (LID) is accordingly 16 bits. A source LID (SLID) and a destination LID (DLID) are the source and destination LIDs used in a local network header. A LLE has a single LID associated with the LLE, and the LID is only unique within a given subnet. One or more LIDs can be associated with each SANIC.

An internet protocol (IP) address (e.g., a 128 bit IPv6 ID) addresses a SANIC. The SANIC, however, can have one or more IP addresses associated with the SANIC. The IP address is used in the global network header when routing frames outside of a given subnet. LIDs and IP addresses are network endpoints and are the target of frames routed through the SAN fabric. All IP addresses (e.g., IPv6 addresses) within a subnet share a common set of high order address bits.

In one embodiment, the LLE is not named and is not architecturally visible to a client process. In this embodiment, management software refers to LLEs as an enumerated subset of the SANIC.

Switches and Routers

Figure 6:
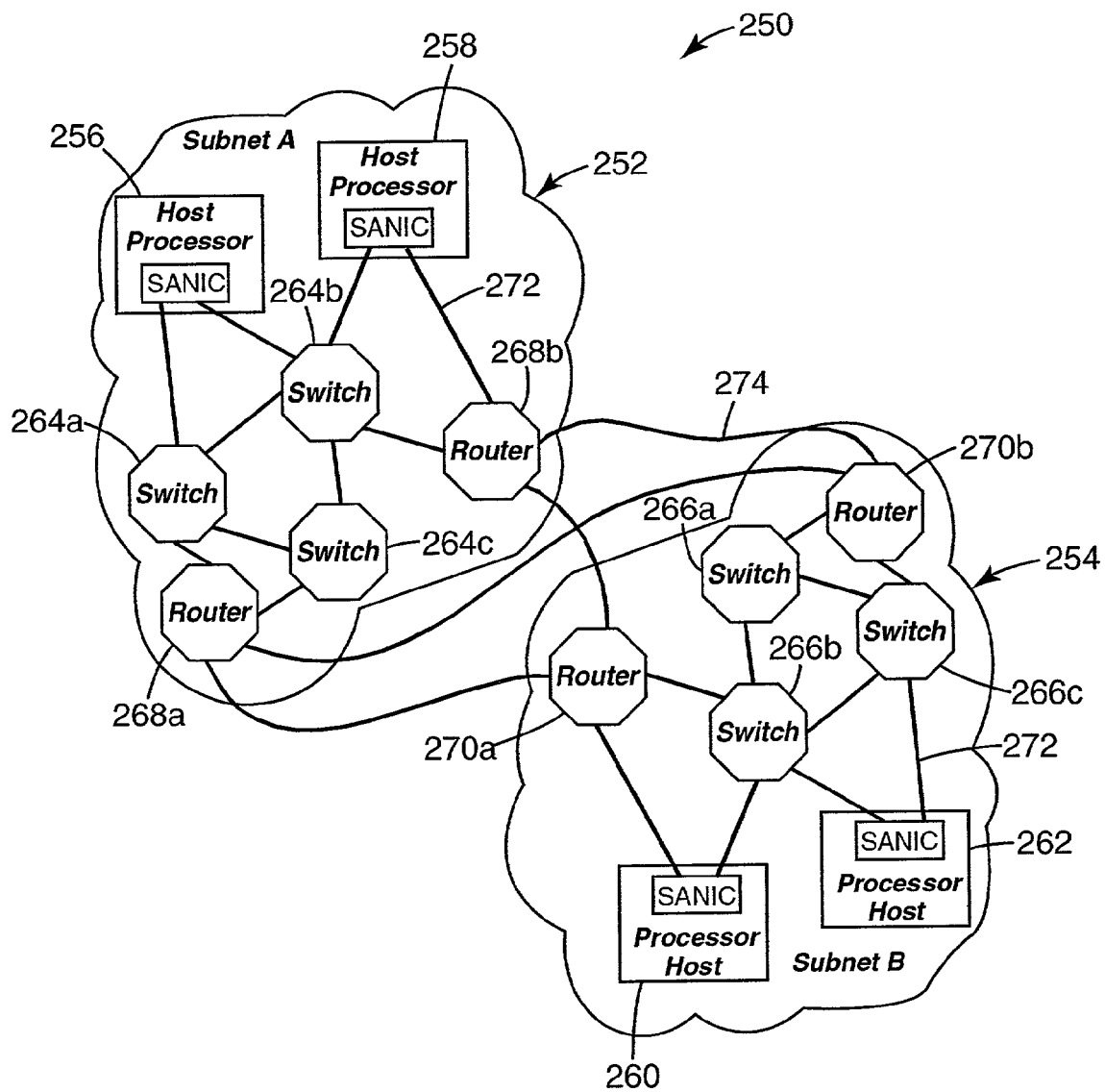
FIG. 6 is a diagram of a portion of a distributed computer system illustrating subnets in the distributed computer system.

A portion of a distributed computer system is generally illustrated at 250 in FIG. 6. Distributed computer system 250 includes a subnet A indicated at 252 and a subnet B indicated at 254. Subnet A indicated at 252 includes a host processor node 256 and a host processor node 258. Subnet B indicated at 254 includes a host processor node 260 and host processor node 262. Subnet A indicated at 252 includes switches 264a–264c. Subnet B indicated at 254 includes switches 266a–266c. Each subnet within distributed computer system 250 is connected to other subnets with routers. For example, subnet A indicated at 252 includes routers 268a and 268b which are coupled to routers 270a and 270b of subnet B indicated at 254. In one example embodiment, a subnet has up to $2^{16}$ endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast worm-hole or cut-through routing for messages.

A switch within a subnet examines the DLID that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 6, for expansion to much larger systems, subnets are connected with routers, such as routers 268 and 270. The router interprets the IP destination ID (e.g., IPv6 destination ID) and routes the IP like frame.

In one embodiment, switches and routers degrade when links are over utilized. In this embodiment, link level back pressure is used to temporarily slow the flow of data when multiple input frames compete for a common output. However, link or buffer contention does not cause loss of data. In one embodiment, switches, routers, and endnodes employ a link protocol to transfer data. In one embodiment, the link protocol supports an automatic error retry. In this example embodiment, link level acknowledgments detect errors and force retransmission of any data impacted by bit errors. Link-level error recovery greatly reduces the number of data errors that are handled by the end-to-end protocols. In one embodiment, the user client process is not involved with error recovery no matter if the error is detected and corrected by the link level protocol or the end-to-end protocol.

Figure 7:
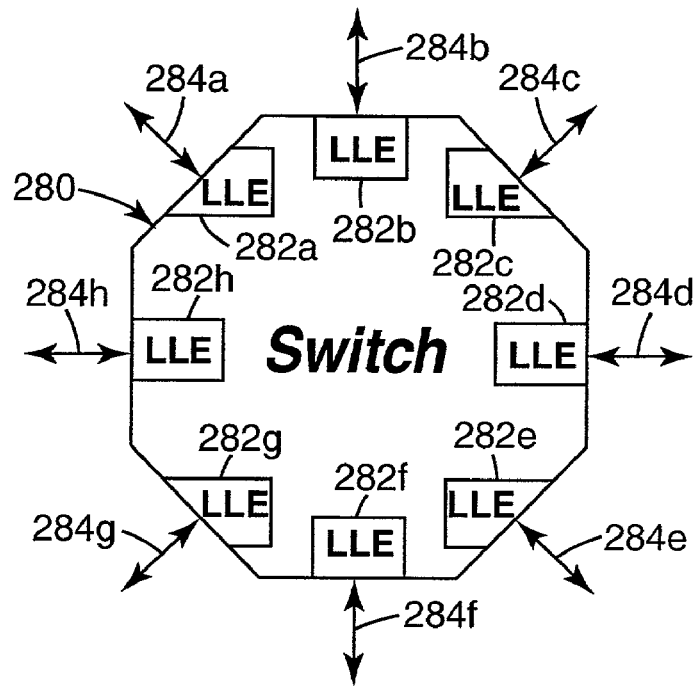
FIG. 7 is a diagram of a switch for use in a distributed computer system implemented the present invention.

An example embodiment of a switch is generally illustrated at 280 in FIG. 7. Each I/O path on a switch or router has an LLE. For example, switch 280 includes LLEs 282a–282h for communicating respectively with links 284a–284h.

The naming scheme for switches and routers is similar to the above-described naming scheme for endnodes. The following is an example switch and router naming scheme for identifying switches and routers in the SAN fabric. A switch name identifies each switch or group of switches packaged and managed together. Thus, there is a single switch name for each switch or group of switches packaged and managed together.

Each switch or router element has a single unique GUID. Each switch has one or more LIDs and IP addresses (e.g., IPv6 addresses) that are used as an endnode for management frames.

Each LLE is not given an explicit external name in the switch or router. Since links are point-to-point, the other end of the link does not need to address the LLE.

Virtual Lanes

Switches and routers employ multiple virtual lanes within a single physical link. As illustrated in FIG. 6, physical links 272 connect endnodes, switches, and routers within a subnet. WAN or LAN connections 274 typically couple routers between subnets. Frames injected into the SAN fabric follow a particular virtual lane from the frame's source to the frame's destination. At any one time, only one virtual lane makes progress on a given physical link. Virtual lanes provide a technique for applying link level flow control to one virtual lane without affecting the other virtual lanes. When a frame on one virtual lane blocks due to contention, quality of service (QoS), or other considerations, a frame on a different virtual lane is allowed to make progress.

Virtual lanes are employed for numerous reasons, some of which are as follows. Virtual lanes provide QoS. In one example embodiment, certain virtual lanes are reserved for high priority or isonchronous traffic to provide QoS.

Virtual lanes provide deadlock avoidance. Virtual lanes allow topologies that contain loops to send frames across all physical links and still be assured the loops won't cause back pressure dependencies that might result in deadlock.

Virtual lanes alleviate head-of-line blocking. With virtual lanes, a blocked frames can pass a temporarily stalled frame that is destined for a different final destination.

In one embodiment, each switch includes its own crossbar switch. In this embodiment, a switch propagates data from only one frame at a time, per virtual lane through its crossbar switch. In another words, on any one virtual lane, a switch propagates a single frame from start to finish. Thus, in this embodiment, frames are not multiplexed together on a single virtual lane.

Paths in SAN fabric

Referring to FIG. 6, within a subnet, such as subnet A indicated at 252 or subnet B indicated at 254, a path from a source port to a destination port is determined by the LID of the destination SANIC port. Between subnets, a path is determined by the IP address (e.g., IPv6 address) of the destination SANIC port.

In one embodiment, the paths used by the request frame and the request frame's corresponding positive acknowledgment (ACK) or negative acknowledgment (NAK) frame are not required to be symmetric. In one embodiment employing oblivious routing, switches select an output port based on the DLID. In one embodiment, a switch uses one set of routing decision criteria for all its input ports. In one example embodiment, the routing decision criteria is contained in one routing table. In an alternative embodiment, a switch employs a separate set of criteria for each input port.

Each port on an endnode can have multiple IP addresses. Multiple IP addresses can be used for several reasons, some of which are provided by the following examples. In one embodiment, different IP addresses identify different partitions or services on an endnode. In one embodiment, different IP addresses are used to specify different QoS attributes. In one embodiment, different IP addresses identify different paths through intra-subnet routes.

In one embodiment, each port on an endnode can have multiple LIDs. Multiple LIDs can be used for several reasons some of which are provided by the following examples. In one embodiment, different LIDs identify different partitions or services on an endnode. In one embodiment, different LIDs are used to specify different QoS attributes. In one embodiment, different LIDs specify different paths through the subnet.

A one-to-one correspondence does not necessarily exist between LIDs and IP addresses, because a SANIC can have more or less LIDs than IP addresses for each port. For SANICs with redundant ports and redundant conductivity to multiple SAN fabrics, SANICs can, but are not required to, use the same LID and IP address on each of its ports.

Data Transactions

Referring to FIG. 1, a data transaction in distributed computer system 30 is typically composed of several hardware and software steps. A client process of a data transport service can be a user-mode or a kernel-mode process. The client process accesses SANIC 42 hardware through one or more QPs, such as QPs 64 illustrated in FIG. 2. The client process calls an operating-system specific programming interface which is herein referred to as verbs. The software code implementing the verbs intern posts a WQE to the given QP work queue.

There are many possible methods of posting a WQE and there are many possible WQE formats, which allow for various cost/performance design points, but which do not affect interoperability. A user process, however, must communicate to verbs in a well-defined manner, and the format and protocols of data transmitted across the SAN fabric must be sufficiently specified to allow devices to interoperate in a heterogeneous vendor environment.

In one embodiment, SANIC hardware detects WQE posting and accesses the WQE. In this embodiment, the SANIC hardware translates and validates the WQEs virtual addresses and accesses the data. In one embodiment, an outgoing message buffer is split into one or more frames. In one embodiment, the SANIC hardware adds a transport header and a network header to each frame. The transport header includes sequence numbers and other transport information. The network header includes the destination IP address or the DLID or other suitable destination address information. The appropriate local or global network header is added to a given frame depending on if the destination endnode resides on the local subnet or on a remote subnet.

A frame is a unit of information that is routed through the SAN fabric. The frame is an endnode-to-endnode construct, and is thus created and consumed by endnodes. Switches and routers neither generate nor consume request frames or acknowledgment frames. Instead switches and routers simply move request frames or acknowledgment frames closer to the ultimate destination. Routers, however, modify the frame's network header when the frame crosses a subnet boundary. In traversing a subnet, a single frame stays on a single virtual lane.

When a frame is placed onto a link, the frame is further broken down into flits. A flit is herein defined to be a unit of link-level flow control and is a unit of transfer employed only on a point-to-point link. The flow of flits is subject to the link-level protocol which can perform flow control or retransmission after an error. Thus, flit is a link-level construct that is created at each endnode, switch, or router output port and consumed at each input port. In one embodiment, a flit contains a header with virtual lane error checking information, size information, and reverse channel credit information.

If a reliable transport service is employed, after a request frame reaches its destination endnode, the destination endnode sends an acknowledgment frame back to the sender endnode. The acknowledgment frame permits the requestor to validate that the request frame reached the destination endnode. An acknowledgment frame is sent back to the requestor after each request frame. The requester can have multiple outstanding requests before it receives any acknowledgments. In one embodiment, the number of multiple outstanding requests is determined when a QP is created.

Example Request and Acknowledgment Transactions

Figure 8:
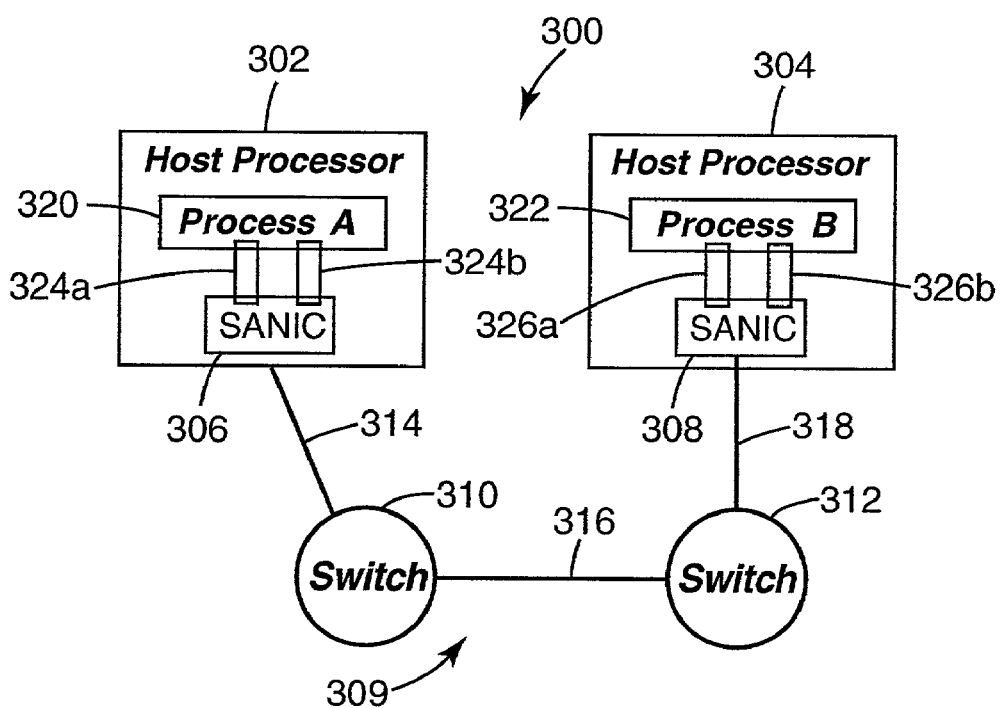
FIG. 8 is a diagram of a portion of a distributed computer system.

FIGS. 8, 9A, 9B, 10A, and 10B together illustrate example request and acknowledgment transactions. In FIG. 8, a portion of a distributed computer system is generally illustrated at 300. Distributed computer system 300 includes a host processor node 302 and a host processor node 304. Host processor node 302 includes a SANIC 306. Host processor node 304 includes a SANIC 308. Distributed computer system 300 includes a SAN fabric 309 which includes a switch 310 and a switch 312. SAN fabric 309 includes a link 314 coupling SANIC 306 to switch 310; a link 316 coupling switch 310 to switch 312; and a link 318 coupling SANIC 308 to switch 312.

In the example transactions, host processor node 302 includes a client process A indicated at 320. Host processor node 304 includes a client process B indicated at 322. Client process 320 interacts with SANIC hardware 306 through QP 324. Client process 322 interacts with SANIC hardware 308 through QP 326. QP 324 and 326 are software data structures. QP 324 includes send work queue 324*a* and receive work queue 324*b*. QP 326 includes send work queue 326*a* and receive work queue 326*b*.

Process 320 initiates a message request by posting WQEs to send queue 324*a*. Such a WQE is illustrated at 330 in FIG. 9A. The message request of client process 320 is referenced by a gather list 332 contained in send WQE 330. Each entry in gather list 332 points to a virtually contiguous buffer in the local memory space containing a part of the message, such as indicated by virtual contiguous buffers 334*a*–334*d*, which respectively hold message 0, parts 0, 1, 2, and 3.

Figure 9A:
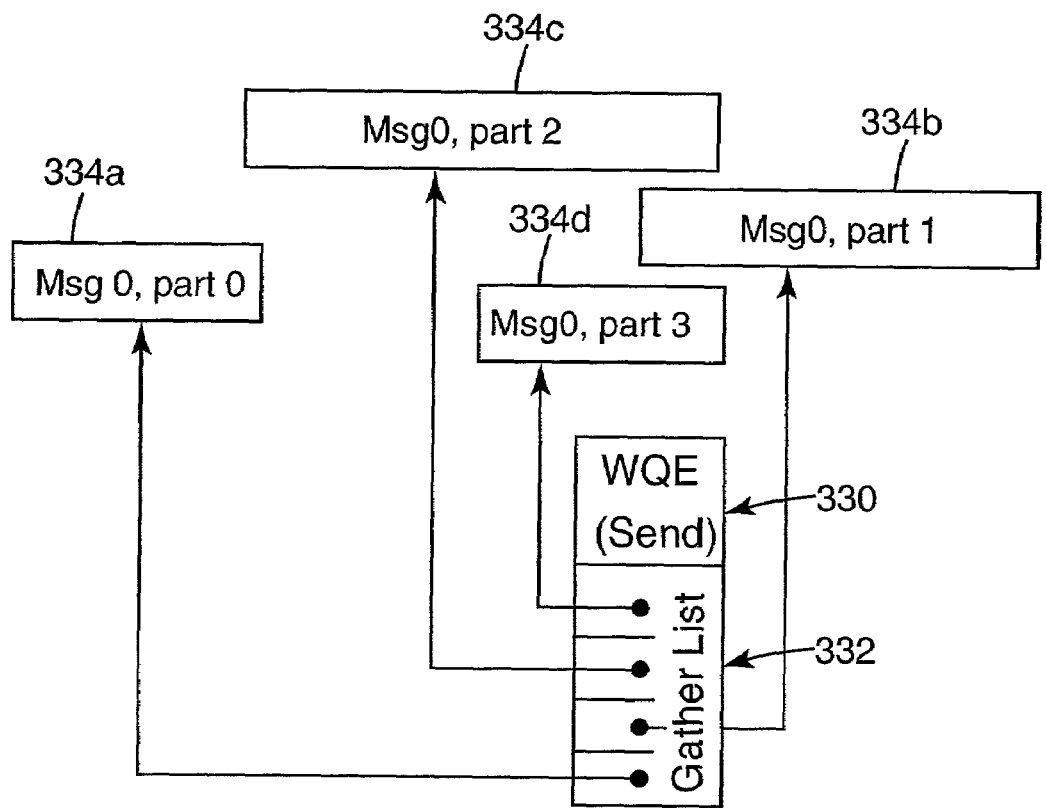
FIG. 9A is a diagram of a work queue element (WQE) for operation in the distributed computer system of FIG. 8.
Figure 9B:
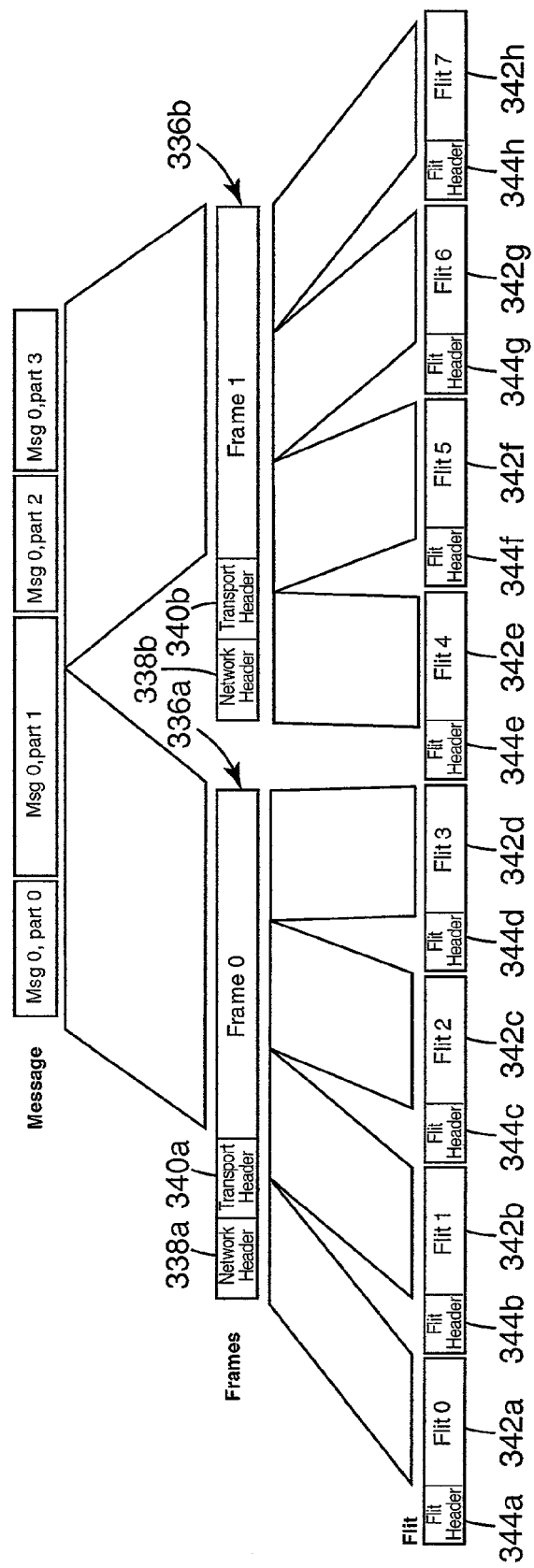
FIG. 9B is a diagram of the packetization process of a message created by the WQE of FIG. 9A into frames and flits.

Referring to FIG. 9B, hardware in SANIC 306 reads WQE 330 and packetizes the message stored in virtual contiguous buffers 334*a*–334*d* into frames and flits. As illustrated in FIG. 9B, all of message 0, part 0 and a portion of message 0, part 1 are packetized into frame 0, indicated at 336*a*. The rest of message 0, part 1 and all of message 0, part 2, and all of message 0, part 3 are packetized into frame 1, indicated at 336*b*. Frame 0 indicated at 336*a* includes network header 338*a* and transport header 340*a*. Frame 1 indicated at 336*b* includes network header 338*b* and transport header 340*b*.

As indicated in FIG. 9B, frame 0 indicated at 336*a* is partitioned into flits 0–3, indicated respectively at 342*a*–342*d*. Frame 1 indicated at 336*b* is partitioned into flits 4–7 indicated respectively at 342*e* –342*h*. Flits 342*a* through 342*h* respectively include flit headers 344*a*–344*h*.

Frames are routed through the SAN fabric, and for reliable transfer services, are acknowledged by the final destination endnode. If not successively acknowledged, the frame is retransmitted by the source endnode. Frames are generated by source endnodes and consumed by destination endnodes. The switches and routers in the SAN fabric neither generate nor consume frames.

Flits are the smallest unit of flow control in the network. Flits are generated and consumed at each end of a physical link. Flits are acknowledged at the receiving end of each link and are retransmitted in response to an error.

Figure 10A:
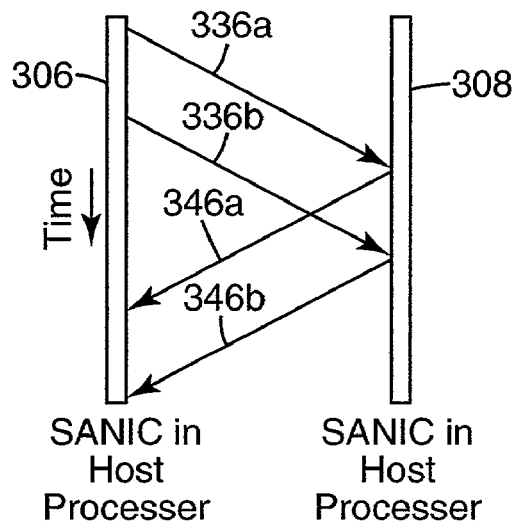
FIG. 10A is a diagram of a message being transmitted with a reliable transport service illustrating frame transactions.

Referring to FIG. 10A, the send request message 0 is transmitted from SANIC 306 in host processor node 302 to SANIC 308 in host processor node 304 as frames 0 indicated at 336*a* and frame 1 indicated at 336*b*. ACK frames 346*a* and 346*b*, corresponding respectively to request frames 336*a* and 336*b*, are transmitted from SANIC 308 in host processor node 304 to SANIC 306 in host processor node 302.

In FIG. 10A, message 0 is being transmitted with a reliable transport service. Each request frame is individually acknowledged by the destination endnode (e.g., SANIC 308 in host processor node 304).

Figure 10B:
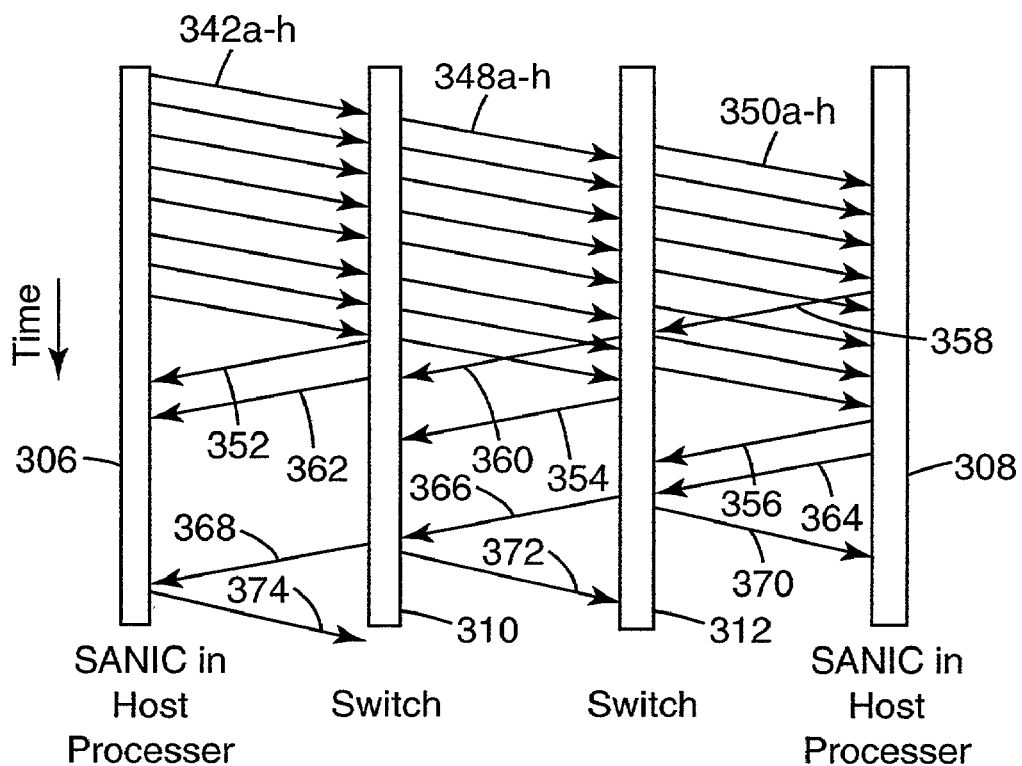
FIG. 10B is a diagram illustrating a reliable transport service illustrating flit transactions associated with the frame transactions of FIG. 10A.

FIG. 10B illustrates the flits associated with the request frames 336 and acknowledgment frames 346 illustrated in FIG. 10A passing between the host processor endnodes 302 and 304 and the switches 310 and 312. As illustrated in FIG. 10B, an ACK frame fits inside one flit. In one embodiment, one acknowledgment flit acknowledges several flits.

As illustrated in FIG. 10B, flits 342*a*–h are transmitted from SANIC 306 to switch 310. Switch 310 consumes flits 342*a*–h at its input port, creates flits 348*a*–*h* at its output port corresponding to flits 342*a*–h, and transmits flits 348*a*–h to switch 312. Switch 312 consumes flits 348*a*–h at its input port, creates flits 350*a*–h at its output port corresponding to flits 348*a*–h, and transmits flits 350*a*–h to SANIC 308. SANIC 308 consumes flits 350*a*–h at its input port. An acknowledgment flit is transmitted from switch 310 to SANIC 306 to acknowledge the receipt of flits 342a–h. An acknowledgment flit 354 is transmitted from switch 312 to switch 310 to acknowledge the receipt of flits 348a–h. An acknowledgment flit 356 is transmitted from SANIC 308 to switch 312 to acknowledge the receipt of flits 350a–h.

Acknowledgment frame 346a fits inside of flit 358 which is transmitted from SANIC 308 to switch 312. Switch 312 consumes flits 358 at its input port, creates flit 360 corresponding to flit 358 at its output port, and transmits flit 360 to switch 310. Switch 310 consumes flit 360 at its input port, creates flit 362 corresponding to flit 360 at its output port, and transmits flit 362 to SANIC 306. SANIC 306 consumes flit 362 at its input port. Similarly, SANIC 308 transmits acknowledgment frame 346b in flit 364 to switch 312. Switch 312 creates flit 366 corresponding to flit 364, and transmits flit 366 to switch 310. Switch 310 creates flit 368 corresponding to flit 366, and transmits flit 368 to SANIC 306.

Switch 312 acknowledges the receipt of flits 358 and 364 with acknowledgment flit 370, which is transmitted from switch 312 to SANIC 308. Switch 310 acknowledges the receipt of flits 360 and 366 with acknowledgment flit 372, which is transmitted to switch 312. SANIC 306 acknowledges the receipt of flits 362 and 368 with acknowledgment flit 374 which is transmitted to switch 310.

Architecture Layers and Implementation Overview

A host processor endnode and an I/O adapter endnode typically have quite different capabilities. For example, an example host processor endnode might support four ports, hundreds to thousands of QPs, and allow incoming RDMA operations, while an attached I/O adapter endnode might only support one or two ports, tens of QPs, and not allow incoming RDMA operations. A low-end attached I/O adapter alternatively can employ software to handle much of the network and transport layer functionality which is performed in hardware (e.g., by SANIC hardware) at the host processor endnode.

Figure 11:
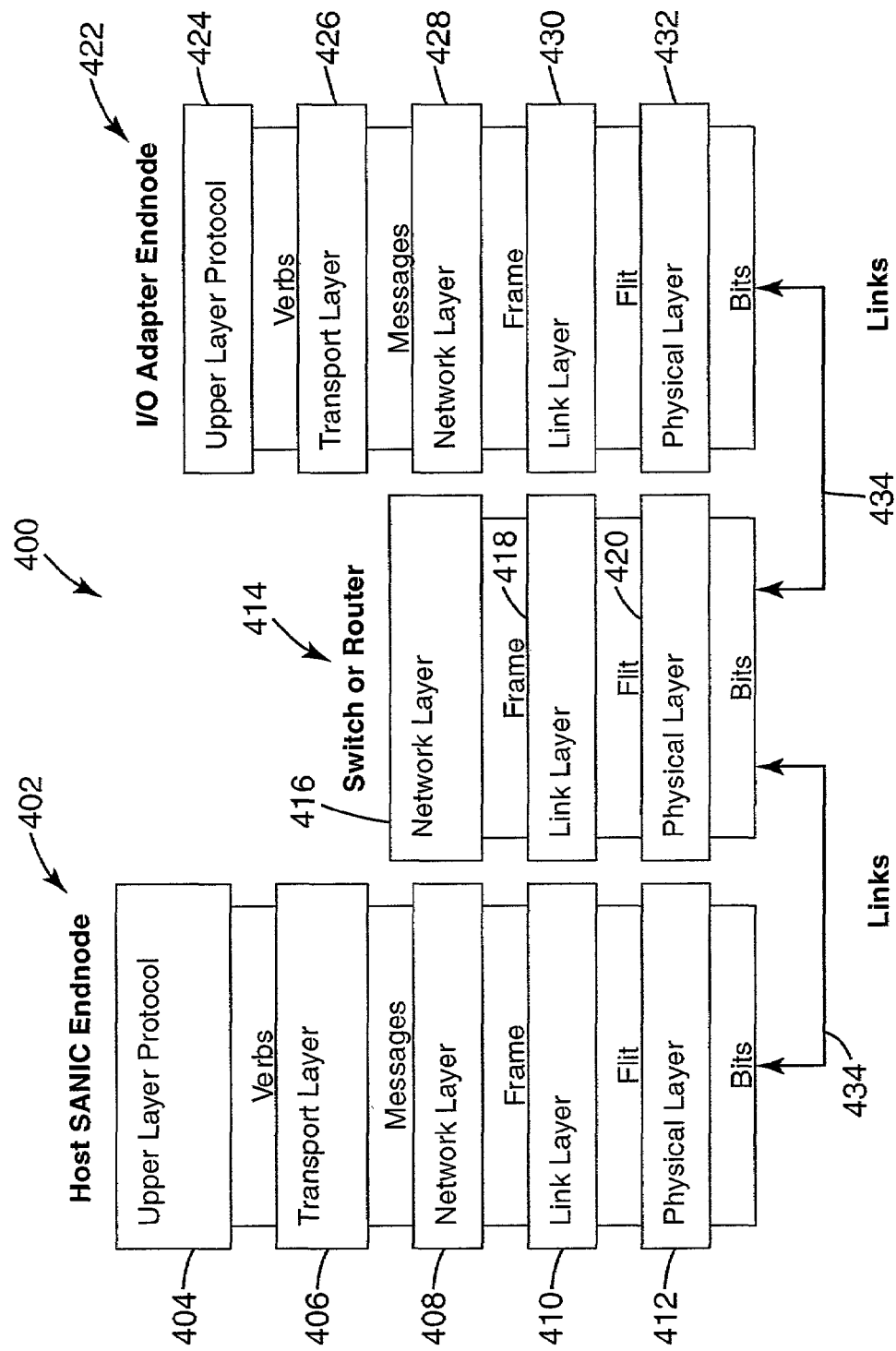
FIG. 11 is a diagram of a layered architecture for implementing the present invention.

One embodiment of a layered architecture for implementing the present invention is generally illustrated at 400 in diagram form in FIG. 11. The layered architecture diagram of FIG. 11 shows the various layers of data communication paths, and organization of data and control information passed between layers.

Host SANIC endnode layers are generally indicated at 402. The host SANIC endnode layers 402 include an upper layer protocol 404; a transport layer 406; a network layer 408; a link layer 410; and a physical layer 412.

Switch or router layers are generally indicated at 414. Switch or router layers 414 include a network layer 416; a link layer 418; and a physical layer 420.

I/O adapter endnode layers are generally indicated at 422. I/O adapter endnode layers 422 include an upper layer protocol 424; a transport layer 426; a network layer 428; a link layer 430; and a physical layer 432.

The layered architecture 400 generally follows an outline of a classical communication stack. The upper layer protocols employ verbs to create messages at the transport layers. The transport layers pass messages to the network layers. The network layers pass frames down to the link layers. The link layers pass flits through physical layers. The physical layers send bits or groups of bits to other physical layers. Similarly, the link layers pass flits to other link layers, and don't have visibility to how the physical layer bit transmission is actually accomplished. The network layers only handle frame routing, without visibility to segmentation and reassembly of frames into flits or transmission between link layers.

Bits or groups of bits are passed between physical layers via links 434. Links 434 can be implemented with printed circuit copper traces, copper cable, optical cable, or with other suitable links.

The upper layer protocol layers are applications or processes which employ the other layers for communicating between endnodes.

The transport layers provide end-to-end message movement. In one embodiment, the transport layers provide four types of transport services as described above which are reliable connection service; reliable datagram service; unreliable datagram service; and raw datagram service.

The network layers perform frame routing through a subnet or multiple subnets to destination endnodes.

The link layers perform flow-controlled, error controlled, and prioritized frame delivery across links.

The physical layers perform technology-dependent bit transmission and reassembly into flits.

Congestion Management Architecture

Congestion Control Mechanisms

Congestion control mechanisms fall into three categories: congestion detection mechanisms; congestion reporting mechanisms; and congestion response mechanisms.

Congestion detection mechanisms covers the mechanisms used to detect congestion in the various network topologies given SAN fabric will support.

Congestion reporting mechanisms covers the mechanism used to report the occurrence of congestion for short term use in alleviating congestion and for long term network management use (e.g., to allow a network management entity to analyze the network and recommend further actions to the system administrator).

Congestion response mechanisms covers the mechanisms used to alleviate or remove congestion from the various network topologies the SAN fabric will support.

SAN fabric congestion detection mechanisms are tailored for end points and switches and must be supported by the end points (e.g., hosts and I/O) In one embodiment, all types of switches (i.e., low to high end) support given SAN fabric congestion detection mechanism. In one embodiment, the switch case is more flexible: high-end switches must support all the mechanisms, low-end switches must support only the abnormal congestion detection. The problem with this second approach is it is difficult to pin the distinction between a low-end and high-end switch, and as a result a high-end switch may not implement much of the congestion control mechanisms, which would defeat the purpose.

Congestion Detection Mechanisms

One embodiment of the present invention is directed to a congestion management architecture in distributed computer systems which provide for efficient congestion control implementations to alleviate congestion problems in the distributor computer system, such as computer distributor system 30 of FIG. 1.

Switch and Router Mechanisms

Queue depth watermarking when queues in a switch reach a HighWaterMark amount of total queue capacity, being to drop all frames that are marked droppable. When queues remain at the HighWaterMark for an AbnormalCongestionTimer period or no forward progress is made on any single switch send port, consider the condition Abnormal Congestion and begin to drop all frame types.

If switch queues are not very large, then the ration between HighWaterMark and total queue capacity may be too small to handle droppable frames in a fair manner. For low-end San fabric switches, with small queues, a queue depth based congestion detection mechanism is not practical.

Time in queue Timestamp all frames placed in the switch queue upon reception. If a frame is queued in the switch for longer than a (programmable) time period, it will be discarded. Another option is for the switch to use virtual lane (VL) credits for congestion detection and respond by discarding frames marked with the oldest timestamps.

Similar to queue depth watermarking, the time in queue approach assume switch queues are relatively large, which for low-end SAN fabric switches is a poor assumption.

VL credit starvation there are two components to this switch congestion detection process: sender starvation and receiver starvation, both must have occurred several times over a NormalCongestionTime period for the switch to be under Normal Congestion. Sender starvation occurs when the switch has accepts an incoming frame, but does not have a space in the sending port's frame (retransmission) queue. Receiver starvation occurs when the switch detects VL credit starvation at a switch receive port. If both conditions occur simultaneously, the switch has detected Normal Congestion.

VL credit starvation can be used to detect congestion in switches that have small queues for large queues. The VL credit starvation approach described here must be supported by San fabric switches.

The switches must have two congestion detection timers: AbnormalCongestionTimer and NormalCongestionTimer.

The AbnormalCongestionTimer is used to detect a very long time period over which no forward progress has been made on any single switch receive/VL port. FN An architectural alternative would be to detect lack of forward progress at the receiver port by determining if any switch receiver/VL has gone a timer period without having any link credits are available. Either approach works. Lack of forward progress at a switch receiver port sounds backwards but it detects lack of forward progress at the point where actions taken at the detection point can ease congestion in the fabric. The switch detects lack of forward progress at any single one of its receive ports, by determining if any switch receive/VL port has gone an AbnormalCongestionTime period without having any link credits available. FN That is, the switch was not able to provide credits, on any single VL, to the nearest neighbor connected to the switches receiver port. If so, the switch reports an AbnormalCongestionTime condition and responds with the Abnormal Congestion mechanisms described below.

For Normal Congestion control the switch uses a combination of receive/VL port credit and send/VL port output buffer starvation.

A switch detects congestion at a send/VL port when the switch has a frame available for the send/VL port, but the send/VL port has no output (e.g., frame retransmission buffer) space available to accept the frame. If this occurs a programmable number of SendPortCongestion times during a NormalCongestionTime period, then the send/VL port is considered to be under congestion. The SendPortCongestion time will have a default value of the flit round trip time between the switch end port and it's nearest neighbor receiver port divided by the number of frames the switch output buffer can store.

However, this condition alone is sufficient to differentiate between switch congestion and excessive flow queue depth, because it only detects congestion at the send/VL port (vs a switch receive/VL-to-send/VL port flow).

A switch detects congestion at a receiver/VL port when any single VL at the switch's receive port has no credits available (i.e. the switch has non VL credits available to send the nearest neighbor attached to that receiver/VL port). If this occurs a programmable number of ReceivePortCongestion times during a NormalCongestionTime period, then the receive/VL port is considered to be under congestion. The ReceivePortCongestion time will have a default value of the flit round trip time between the switch receive port and it's nearest neighbor send port divided by the number of frames the switch output buffers can store.

If both congestion conditions occur a maximum programmable number of SwitchCongest time during a NormalCongestionTime period, then the switch in under Normal Congestion. The SwitchCongested value will have some default value (e.g., 5). In one embodiment, a methodology is used for setting the SwitchedCongested default value based on switch utilization, (e.g., the higher the switch is utilized, the lower the value).

The default value for the abnormal congestion timer will be set to a (high) value (e.g., 100 ms). For example, 100 ms corresponds with 256 KB frames at 1 GB/s for the first 10 generation. That is, no forward progress was allowed on the switch receive ports for 256 4 KB frame cycle. An alternative is the set the default as scalable with link bandwidth, as the link bandwidth goes up, the default value goes down. But if the maximum frame size increases as well, then a fixed value can have the same cycle attributes. In one embodiment, the default value for the normal congestion timer will be set to 1/Nth of the abnormal congestion timer.

End Point Mechanisms

Explicit detection end point congestion detection mechanisms are implemented at the end point receivers (i.e., destinations). Destination detection under this approach the destination must detect Forward Explicit Congestion Notification (FECN) conditions forwarded at the flit level. The destination will forward the FECN to the source. The source will then make the injection rate adjustments. In source detection under this approach, the source must also detect FECN conditions forwarded at the flit level for Read RDMAs. The source will then make the injection rate adjustments.

Implicit detection end point congestion detection mechanisms are implement at the end point sender (i.e., sources).

A network can implement a few implicit congestion detection mechanisms, from the simple to the complex. One embodiment supports one (ACK time-out).

Frame to ACK cycle timing not recommended due to complexity and inability to function correctly when the network contains a mix of local and remote endpoints.

Under this approach, the injection rate (i.e., bytes per second) is adjusted by monitoring the previous injection rate and the cycle time of frames within the network. The cycle time calculation needs to be made on the basis of the round trip time between a frame and it's corresponding ACK. The cycle time calculation cannot be made based on the time gap between ACKs, because the source may not always have frames to send and compensating for the frame sending time gap is not possible. If the source's frame injection rate is not continuous (i.e., the sources' send rate has time gaps), then those time gaps need to be accounted for in a cycle time calculation that strictly looks at time gaps between ACKs. This compensation becomes very problematic. Let's say, the source calculates the time delay caused by the congested switch stage by calculating the time gap between incoming frame ACKs. For example, the ACK for frame 1 was received at time A and the ACK for frame 2 was received at time B, so that time gap would be B-A. This approach would correctly reflect the time gap caused by the congested stage, so long as the source injection rate has no time gaps. However, if the source's frame injection rate also has a tie gap, then the time gap would have to be compensated for by calculating the time gap between frame sends. For example frame sequence number 1 was sent at time X, frame sequence number 2 was sent at time Y the time gap would be Y-Z. Unfortunately, the frame injection time (Y-X) cannot be easily removed from the time gap caused by the congested state (B-A), because the (B-A-Y-X) calculation would not longer just reflect the effect of the congested stage. This assumption is invalid for SAN traffic. The way this approach works is as follows.

The source monitors the number of outstanding requests over a source-destination/VL path; the number of bytes/second that the source is ending over the source-destination/VL path; and the time gap between each frame and it's corresponding ACK.

The source calculates the frame cycle time by calculating the time delay between a frame send and it's corresponding ACK or RNR_NAK received from the destination.

The source would then calculate the throughput as: Original frame size divided by the cycle time.

The source would then increase the injection rate until the throughput beings to decrease. When the throughput begins to decrease, the source would back up to the previous injection rate size.

The main issue with this approach is the complexity it causes for the source's scheduler. It is believed that this complexity makes this approach unobtainable.

The problem with using a slight simpler ACK gap time approach is that it doesn't compensate for source injection gaps (i.e., through put variations at the source that are not caused by fabric congestion adjustments, but rather by source demand rate adjustments) and as a result it doesn't perform it' intended function. A second, perhaps more important problem with ACK gap timing is that when a given source has flows with more than one minimum bandwidth, under congestion the higher bandwidth flow will have the same ACK gap timing as the lower bandwidth flows. As a result, the source will lower the link injection rate of all flows vs isolating the flows that are congested.

Performing ACK timeouts under this approach, the injection rate (i.e., bytes/seconds outstanding) is adjusted by monitoring ACK time-outs. The injection rate can be lowered at various levels; message, frame, flit, or bytes/second. Given the wide range of frame sizes in a local fabric (e.g., from 32 byte request to a 4 GB disk sequential write. For this example, SAN fabric injection rate is in bytes/second. When an ACK time-out occurs, the source assumes the ACK time-out occurred due to congestion. That is, a stage in the network has dropped the frame due to congestion. When an ACK time-out occurs, the source will modify the injection rate by half and resume transmission form the last frame expected. The source will then wait a fixed WANCongestionCleared time period before increasing the window size. After the WANCongestionCleared time period has elapsed, the source would increase the window size linearly.

Of these two implicit congestion detection approaches, ACK time-outs seem less complex for the source's scheduler. It is required to support SAN Fabric over LAN/WAN fabrics. The proposal would be to use implicit congestion detected based on ACK time-outs for paths that include non-SAN fabrics, as follows.

The source's Transport level ERP would detect the ACK timeout. The source's schedule would cut the injection rate for the affected path (source-destination/VL) by half. The source would then begin retransmission of the affected queue pair starting at the next expected frame. IN one embodiment, the source would wait a WANCongestionCleared time period before increasing the injection rate. When the WANCongestionCleared timer pops the source would increase the injection rate linearly.

In an alternative embodiment, the source would wait to receive ACK for a programmable number of WANUncongested frames. If WANUncongested frames get ACK'd, then the SAN Fabric WAN traffic is no longer under congestion. So increase the injection rate linearly.

Congestion Reporting Mechanism

The forward explicit congestion notification is architected into the flit and frame layers of the fabric. For Send and Write RDMA frames FECN is detected at the flit layer and reported at the frame layer. For FetchOP and Read RDMA frames FECN is detected at the flit layer and reported at the flit and frame layer: frames from source-destination (e.g., Read RDMA request) will get reported at the frame layer, and frames from destination-source (e.g., Read RDMA data) will get reported at the flit layer. For ACK/NAK frames FECN is detected at the flit layer, but the end-point will discard. FN Alternatively, and end-point may discriminate between ACK/NAK received in response to a Send/Write-RDMA frame; and don't adjust the injection rte for ACK/NAKs with a non-zero FECNCount received in response to a FetchOp/Read-RDMA frame.

Switch Mechanisms

In one embodiment, flits have 4 bits to carry FECN. These 4 bits are called the FECNCount and are contained in the flit delimeter. The source must set the FECNCount to zero. SAN fabric switches will increment the FECNCount if the switch is under congestion, until the FECNCount reaches the maximum value (15). When the FECNCount is equal to 15, switches will not increment it, because it's already at its maximum. Each switch state is responsible for maintaining the flit level FECN notification as it goes across the switch's internal receive to sender path. This can be done by carrying the flit types fields around, or simply carrying a bit around.

For a given flow (source destination/VL), the FECNCount accumulates the number of switches that are under congestion.

Router Mechanisms

In one embodiment, flits have 4 bits to carry FECN. These 4 bits are called the FECNCount and are contained in the flit delimeter. The source must set the FECNCount to zero. SAN fabric switches will increment the FECNCount if the switch is under congestion, until the FECNCount reaches the maximum value (15). When the FECNCount is equal to 15, switches will not increment it, because it's already at its maximum. Each switch stage is responsible for maintaining the flit level FECN notification as it goes across the switch's internal receiver the sender path. This can be done by carrying the flit types fields around, or simply carrying a bit around.

SAN Fabric to non-SAN Fabric routers are not responsible for propagating the FECNCount fields across the non-SAN fabric. However, they are responsible for sending a frame level Backward Explicit Congestion Notification (BECN) frame containing the FECNCount to the source of the flit that experienced congestion. That is, if a router receives a flit with a non-zero FECNCount, the router is responsible for:

Generating a No-Op frame with the FECNCount field equal to the highest FECNCount in the flit delimeters of the outbound frame.

Sending the No-Op frame to the source of the outbound frame that experienced congestion. The NOP frame will be sent must ACK'd by the source (i.e., or the source may not get any if the intermediate switches discard unACK'd frames).

End Point Mechanisms

The destination's link layer is responsible for detecting the flit level FECN notification and passing the FECN to the destination's transport layer. Irregardless of the frame's error state (i.e., whether the destination will ACK or NAK the frame), the destination's transport layer is responsible for reporting the FECN back to the source for reliable service classes. The destination will set the FECNCount field in the outbound ACK/NAK frame to the highest FECNCount received in the flit delimeters associated with the inbound frame.

Congestion Response Mechanism

End Point Mechanisms

The source's scheduler should be contained in hardware for SAN Fabric traffic over SAN fabrics, otherwise the major benefits of SAN Fabric can be lost. A design issues is how much additional complexity does the dynamic adjustment add to the source's scheduler.

The source's scheduler has the ability to lower the max QP injection rate based on the reception of an ACK or NAK with a non-zero FECNCount from the destination. There are several options for lowering the max QP injection rate based on FECN.

One standard approach is to maintain two counters per QP: FECN0 and FECN1. FECN0 counts the number of ACK/NAKs received with a zero FECNCount. FECN1 accumulates FECNCount(s) received from ACK/NAKs. The counts are accumulated over a time period FECN_Time of 4× static end—end RTT. If FECN1>=FECN0 over FECN_Time, then set the max QP injection rate to half (often percentage values can be used, such as 0.875). The previous max QP injection rate to twice the previous max QP injection rate FN two more bits and one more timer can be implemented to dampen and settle down the injection rate oscillations. This basically uses aggressive QP injection rate acceleration, which can cause larger fluctuations in traffic, but also aggressively removes congestion. For a SAN, where the large fluctuations may impact performance, a more reasonable approach seems to be to modify the max QP injection rate more linearly, say by reducing max QP injection rates at 85% under congestion and increasing max QP injection rates at 1.15% when congestion subsides.

This approach requires the following state per VL at the source's scheduler:

FECN0 accumulates the number of frames with no congestion.
FECN1 accumulates the FECN count
FECN_Time counts down to zero. When it pops FECN 0 and FECN1 are compared.
Increment Injection Rate when set its used to increment the injection rate.
Decrement Injection Rate when set decrements the injection rate.

A second approach is to start a timer upon the first reception of an ACK/NAK with a non-zero FECNCount from the destination and then accumulate the number of FECNCounts over a period of time starting with the time of the first FECN and ending with a FECN_TIMER_POP. If the total number of FECNCounts collected over the time period is greater than a variable percentage (e.g., half) of the number of outstanding frames during that same time period, then reduce the injection rate. Otherwise, treat the condition as slight congestion and don't change the injection rate.

If a link has been idle for a long time, then set the max QP injection rate to half the previous maximum CP injection rate and increase the Injection Rate (IR) using the slow start algorithm: IR(i+1)=IR(i)*2. Where IR(i) is a rate measurement of the bytes/second that were ACK'd back from the destination.

The QP injection rate is on a bytes/second basis.

Switch Mechanisms

When the NormalCongestionTime pops, the switch will enter NC-State. When in this state, the switch will drop all frames that are marked droppable (i.e., unreliable datagram and raw frames). All frames received on receive ports marked droppable will be dropped. The switch will make the link credits that are freed from this process available to the switch's nearest neighbor using centralized weighted fairness.

The switch will continue to drop frames marked droppable for a time period of 2× the NormalCongestionTimer. This provides weighted fairness (a NormalCongestionTime period) for droppable frames. The switch will then rest the NC_state and restart the NormalCongestionTime timer.

When the AbnormalCongestionTime pops, the switch will drop all frames and consider the situation a permanent error. Meaning the condition has not gone away over a long period and for all intents and purposes it's due to a permanent error, (e.g., dead link, dead destination, broke destination (i.e., no receive WQEs ever). In any case, the source will detect an ACK timeout and will respond according to the policies set in the next sections.

Congestion Behavior

In one embodiment, SAN Fabric components implement levers (mechanisms) appropriate to the component type. In one embodiment, SAN Fabric switches implement a weighted fairness queuing algorithm that prevent receiver starvation. Some levers will be set to a fixed value. Some levers will be variable and set by an algorithm defined in the SAN Fabric specification.

EXAMPLE CONGESTION MANAGEMENT POLICIES

Example 1

No Drops within SAN Fabric, Drops when Non-SAN Fabric Transports Solely Over a SAN Fabric Network Link lever back pressure is used. This means there are not any lot frames due to congestion.

The NormalCongestionTimer=Abnormal Congestion Timer.

Each QP uses the minimum number of outstanding requests to achieve the desired BW for the necessary distance to the destination. (i.e., once maximum BW is achieved, a larger window size can only increase congestion).

Each QP should inject frames at no higher than the maximum W of the slowest link in use. This is important if there are multiple speed SAN Fabric links in use.

The request-response timer should be set high enough that a time-out implies a frame is lost due to an error (as opposed to congestion).

Legacy Protocols Solely over an SAN Fabric network.

Legacy protocol (e.g. TCP) are sent as Raw Datagram frames. These frames do not have an SAN Fabric acknowledgment frame. All acknowledgment occur at the legacy ULP level.

Link lever back pressure means there aren't any lost frames due to congestion.

Frames are injected into the network at some maximum injection rate (e.g. specified in MB/s or frames/second). This maximum rate is based on a QoS parameter and of course on the minimum speed SAN Fabric link in the path between source and destination.

The ULP SW reduces the window size if ULP acknowledgments do not return within a certain time period. In addition to reducing window size, the ULP SW may choose to reduce the injection rate of frames into the SAN Fabric network (i.e. scale back to BW transmitted).

The SW stack controlling the QP should be able to easily set the maximum injection rate, e.g., with a WQE or as port of the post Send verb.

Dropped frames (e.g., due to bit errors or other improbably occurrences) are handled by the ULP and not by the SANIC driver.

SAN Fabric Transport over Both an SAN Fabric Network and WAN Networks(s)

Link level back pressure is used within the SAN Fabric network.

Should the WAN drop frames due to congestion, the frame ACK timer will expire and invoke the implicit congestion response mechanism.

Legacy Protocols over a Mix of SAN Fabric and WAN Networks

As above, the maximum BW injected into the SAN Fabric network should be less than or equal to the maximum BW of the WAN and link level back pressure is used within the SAN Fabric network. WAN is assumed to be slower than the SAN Fabric.

Should the WAN drop frames due to congestion, the legacy ULP will timeout and notice it hasn't received an acknowledgment. It will retransmit frames with a smaller window size and/or with a lower rate of injection into the SAN Fabric network.

The legacy ULP driver will upon receiving acknowledgments increase its window size and/or increase its rate of injection into the SAN Fabric.

Example 2

Drop Datagram and Raw Frame Under Normal Congestion within SAN Fabric, Drops when Non-SAN Fabric Transports Solely Over a SAN Fabric Network Link level back pressure is used. This means there aren't any lost frames due to congestion.

NormalCongestionTimer is set to 1/Nth the value of the AbnormalCongestionTimer.

All of the normal congestion detection, reporting and response mechanisms are implemented, summarized below for completeness:

Detection:
Switch—Detects congestion by analyzing receive and send port resources as stated earlier.
Source—Detects congestion reported by analyzing the FECNCount field in the frame transport header as stated earlier.
Destination—Detects congestion reported by analyzing the FECNCount field in the frame transport header as stated earlier.

Reporting:
Switch—Propagates the FECNCount field in the flit delimiters as stated earlier.
Routers—When a flit has non-zero FECNCount field, sends a No-Op frame to the flit source with the FECNCount field equal to the highest FECNCount of the flits associated with the frame.
Destination—Sets the ACK/NAK FECNCount field equal to the highest FECNCount of the flits associated with the frame.

Response:
Switch—Drops frames when NormalCongestion is encountered as stated earlier.
Source—Lowers injection rate based on FECNCount as described earlier.

Legacy Protocols Solely Over a SAN Fabric Network

Legacy protocols (e.g., TCP) are sent as Raw Datagram frames. These frames do not have a SAN Fabric acknowledgment frame. All acknowledgments occur at the legacy ULP level.

By setting the NormalCongestionTimer AbnormalCongestionTimer, frames will be lost due to normal congestion.

Frame loss will invoke the legacy protocol's injection rate or window size reduction algorithms.

SAN Fabric Transport Over Both a SAN Fabric and WAN Network(s)

Link level back pressure is used within the SAN Fabric network.

Should the WAN drop frames due to congestion, the frame Ack timer will expire and invoke the implicit congestion response mechanism.

Legacy Protocols Over a Mix of SAN Fabric and WAN Networks

Should the WAN drop frames due to congestion, the legacy ULP will timeout and notice it hasn't received an acknowledgment. It will retransmit frames with a smaller window size and/or with a lower rate of injection into the SAN Fabric network.

The legacy ULP driver will upon receiving acknowledgments increase its window size and/or increase its rate of injection into the SAN Fabric network.

Example 3

Drop frames under normal congestion within SAN Fabric, Drops when non-SAN Fabric SAN Fabric transports solely over a SAN Fabric network Link level back pressure is effectively used strictly for short lived flow control between link segments.

AbnormalCongestionTimer is set to a very low value (e.g., 10s of frames vs. 100s or 1000s).

Frames will be lost under moderate congestion and invoke the implicit congestion detection, reporting and response mechanism.

Legacy Protocols Solely Over a SAN Fabric

Legacy protocols (e.g., TCP) are sent as Raw Datagram frames. These frames do not have a SAN Fabric acknowledgment frame. All acknowledgments occur at the legacy ULP level.

Frames will be lost due to moderate congestion.

Frame loss will invoke the legacy protocol's injection rate or window size reduction algorithms.

SAN Fabric Transport Over Both a SAN Fabric Network and WAN Network(s)

Link level back pressure is effectively used strictly for short lived flow control between link segments.

Should the WAN drop frames due to congestion, the frame Ack timer will expire and invoke the implicit congestion response mechanism defined in section 18.10.1.3.

Legacy Protocols Over a Mix of SAN Fabric and WAN Networks

Should the WAN drop frames due to congestion, the legacy ULP will timeout and notice it hasn't received an acknowledgment. It will retransmit frames with a smaller window size and/or with a lower rate of injection into the SAN Fabric network.

The legacy ULP driver will upon receiving acknowledgments increase its window size and/or increase its rate of injection into the SAN Fabric network.

Congestion Scenarios in Example Topologies

Scenario 1—Singleton Host tree with Adapter Leaves.

Figure 12:
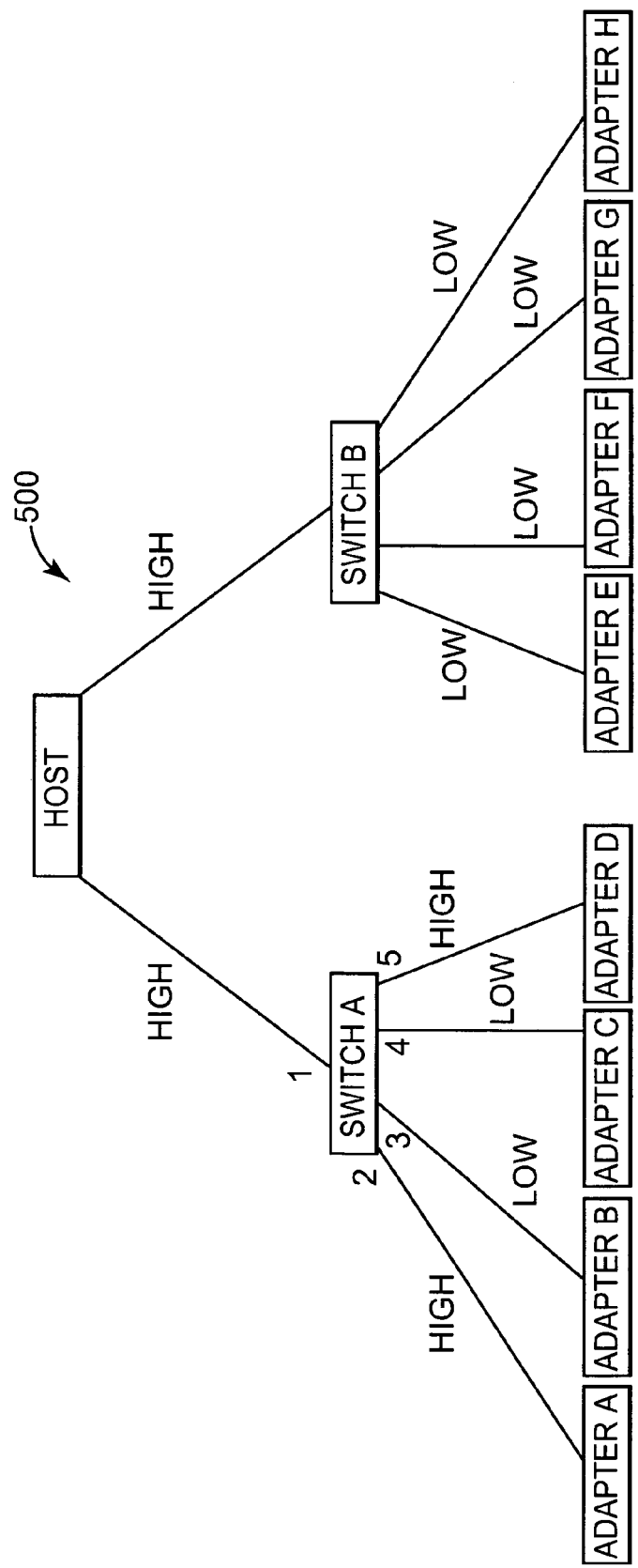
FIG. 12 is a diagram of a simple tree configuration having mixed bandwidth lengths and adaptable links.

A simple tree configuration is generally illustrated at 500 in FIG. 12. This simple tree configuration may cause severe head of line blocking problems in switch A for adapters A and D. Whether switch A experiences these severe problems or not depends on the host's scheduling algorithm and the switch A's congestion control algorithm.

For example, if host A's scheduler doesn't provide a weighted fair schedule queuing (i.e., the host scheduler would use round robin selection for all traffic on the same VL, but would weight traffic for higher priority VLs higher than the traffic for low-priority VLs) that compensates for link bandwidth differences. Weighted fair queuing that compensates for link bandwidth differences means the host scheduler would use round robin selection for all traffic on the same VL, would weight traffic for higher priority VLs higher than traffic for low-priority VLs AND would also weight traffic with the highest minimum path bandwidth higher than traffic with the lowest minimum path bandwidth, then when the host has multiple frames to send adapter B or C (or adapter B and C request multiple Read Remote DMA frames from Host A.), the host can cause long periods of head of line blocking by consuming switch A queue resources. Switch A will free queue resources at the link rate of adapters B and C. As a result, the host will experience periods where no virtual lane credits are available for transfers to adapters A and D.

Several congestion control mechanisms were considered for sources, including: link level back-pressure, Implicit congestion control based on Frame-ACK timing and explicit congestion control based on FECN. Of the several forms of congestion control mechanisms considered, SAN Fabric sources must implement the explicit congestion control approach. The following describes how explicit congestion control works under scenario 1. It will also describe the difficulties with the implicit congestion control approach that was considered.

Use explicit congestion detection by means of FECN back to the source and use slow start with multiplicative decrease.

Under this approach, when head of line blocking at switch A occurs, the switch detects congestion then it marks flits on just the send ports that have detected Normal Congestion with a FECN. To be clear, the switch congestion detection process described in this chapter has two components: sender starvation and receiver starvation, both must have occurred several times over a NormalCongestionTime period for the switch to be under Normal Congestion. Sender starvation: A switch detects a lack of credit at a send port when the switch has a frame queued for the send port, but has no credits available to send data through that send port. If this occurs N times during a NormalCongestionPeriod, then the send port is under congestion. However, this condition alone is insufficient to differentiate between switch congestion and excessive flow queue depths. Receiver starvation: For the switch to determine its under congestion, the switch also has to determine if it has not been able to send credits to any one of its neighbors M times during a NormalCongestionPeriod. If both conditions apply, N occurrence of being out of credits at any send port and M occurrences of being out of credits at any receive port, then the switch is under NormalCongestion. If intermediate switches were included in scenario 1, they would need to pass through the accumulated FECNs to the next stage in the network. In scenario 1's configuration, assuming the flows are a result of long lived workload patterns, then links 3 and 4 will get a FECN before links 2 and 5. As a result, adapters B and C will ACK back to the destination to the FECN, but adapters A and D will not. The host will adjust the injection rates for adapters B and C when they are the cause of congestion.

Use implicit congestion detection by means of Frame-to-ACK timing and use slow-start and multiplicative decrease to respond to congestion. (FN—This is a derivative of TCP Vegas).

Under this approach, when head of line blocking at switch A occurs, the Frame-ACK timing for adapters B and C will appear to be the same as the Frame-ACK timing for adapters C and D. That is, assuming all switch A flows attempt to fully compete for link 1, then all switch A flows will get their injection rates reduced at the host, not just link 1->3 and link 1->4 flows. (This is specially true if Host-AdapterB and Host-AdapterC flows are long and occur before Host-AdapterA and Host-AdapterD flow begin.

Once the injection rates have been reduced, and congestion subsized, all flows will again attempt to increase their injection rates. Assuming the flows are a result of relatively long lived workload patterns, then two cases need to be treated: A) all flows set their injection rate increase time interval to constant; and B) all flows set their injection rate increase time interval based on a function of the Frame-ACK timing during uncongested operations. The Frame-ACK timing will be set to a different value depending on the flow. For example, in the scenario 1 configuration link 1->2 flows will have a much lower frame-ACK value, than link 1->3 flows.

If all flows attempt to increase their injection rates at the same constant time interval, then all flows will find the same conditions are still in effect and the applied load will continue to operate in the middle (lower portion) of the uncongested region. The reason for this being that link 3 and link 4 will continue to cause HOL as long as all flow increase their injection rates simultaneously. This causes the network throughput to operate at a sub-optimal point in the uncongested region.

However, if all flows attempt to increase their injection rates based on a function of the Frame-ACK timing during uncongested operations, then flows with a higher minimum path bandwidth will increase their injection rates at a faster rate than the flows with lower minimum path bandwidths. In this case, link 1->3 and link 1->4 flows will attempt to increase their injection rates more slowly (longer time period between injection rate increases) than link 1->2 and link 1->5 flows (which use a shorter time period between injection rate increases).

Just using link level back-pressure alone by reducing the number of credits available to the host is not very efficient, because the host cannot determine which flows are under end—end back pressure and which flows are not. Again, this will cause all switch A flows to operate at a sub-optimal point in the uncongested region.

If host A's scheduler provides weighted fair schedule queuing that compensates for only static link bandwidth differences, then host A will adjust the injection rate so as to not exceed the lowest link bandwidth rate. For example, the injection rate for host A to adapter B flow would be set to a maximum of the low bandwidth rate; and the injection rate for host A to adapter A flow would be set to a maximum of the high bandwidth rate. This approach would work fine, as long as the configuration is kept to singleton host tree with no peer—peer adapter transfers and no routers. However, scenario 2 and 3 will describe how static flow control is insufficient for a singleton host tree that contains routers or adapters performing peer—peer operations.

The main points are as follows:

For a simple tree network, with no peer—peer and no routers into the internet, dynamic injection rate control using either of the two methods described above will keep the network operating near the optimal point of the uncongested region on average, with intermediate periods of normal congestion.

For a simple tree network, with no peer—peer and no routers into the internet, static injection rate control (i.e. host A's scheduler provides weighted fair schedule queuing that compensates for link bandwidth differences) is also effective at keeping network operation near the optimal point in the uncongested region. However, the next two scenarios will describe why static injection control alone is not effective at keeping network congestion near the optimal point, if this simple singleton host network includes peer—peer and routers into the internet.

Scenario 2—Singleton Host Tree with Peer—Peer Adapter Leaves

This scenario simply adds peer—peer adapter transfers to the configuration depicted in scenario 1.

Again, several congestion control mechanisms were considered for sources, including: link level back-pressure, Inplicit congestion control based on Frame-ACK timing and explicit congestion control based on FECN. Of the several forms of congestion control mechanisms considered, SAN Fabric sources must implement the explicit congestion control approach. The following describes how explicit congestion control works under scenario 2. It will describe the difficulties with the implicit congestion control approach that was considered.

Use explicit congestion detection by means of FECN back to the source and use slow start with mulitplicative decrease.

Under this approach, when HOL blocking at switch A occurs, the switch detects congestion and marks flits with an FECN on just the send ports that have detected Normal Congestion. Assuming the flows are a result of long live workload patterns, the links that are responsible for the congestion will get a FECN before links that are not responsible for the congestion. As a result, the flows that are responsible for congestion will get their injection rates reduced before those that are not. For example, if host A and adapter A both attempt to fully utilize link 5 by attempting to consume link 5's full bandwidth during transfers to adapter E, then both host A and adapter A will lower their injection rates and recover from the congestion.

Use implicit congestion detection by means of Frame-to-ACK timing and use slow-start and mulitplicative decrease to respond to congestion.

Under this approach, when HOL blocking at switch A occurs, the host A's Frame-ACK timing for link 1->3 and link 1->4 flows will appear to be the same as the Frame-ACK timing for the link 1->2 and link 1-5>flows. Similarly, adapter A's Frame-ACK timing for link 3->1 and link 3->5 will appear the same. If host A and adapter A each set their injection rate increase time interval based on a function of the Frame-ACK timing during uncongested operations, then Normal Congestion problems will be quickly detected and recovered allowing the network to operate in the uncongested region.

But now the main problem with a Frame-ACK timing based (e.g. TCP Vegas style dynamic injection rate control surfaces: fairness. There is an enhanced TCP Vegas style injection create control algorithm that is claimed to improve fairness significantly, but at the cost of greater instability. This enhanced algorithm should be analyzed for applicability. If host A is consuming the full bandwidth available on link 5, and adapter A begins to also transfer data over link 5, then soon host A and adapter A will get their injection rates lowered. If host A was operating at a higher rate than adapter A, then it will get a large share of link 5's bandwidth.

Just using link level back-pressure alone by reducing the number of credits available to the host is not very efficient, because the host cannot determine which flows are under end—end back-pressure and which flows are not. Again, this will cause all switch A flows to operate at a sub-optimal point in the uncongested region.

If host A and adapter A's scheduler provides weighted fair schedule queuing that compensates for only static link bandwidth differences, then host A and adapter A will not adjust their injection rates when their flows conflict and cause normal congestion.

Scenario 3—Singleton Host Tree with Adapter and Router Leaves.

Figure 13:
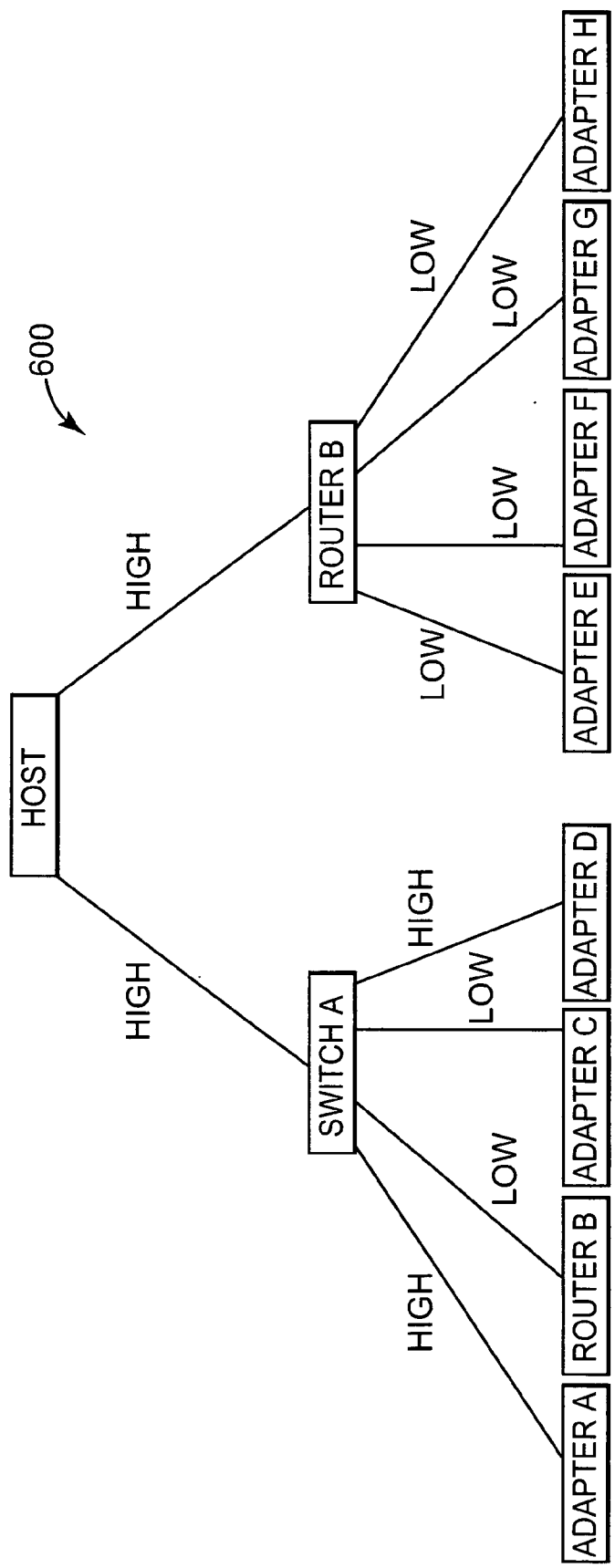
FIG. 13 is a diagram of a simple tree with mixed bandwidth lengths and adapter and router links.

As second simple tree configuration is generally illustrated at 600 in FIG. 13 to illustrate scenario 3. As illustrated in FIG. 13, scenario 3 replaces adapter B in the configuration depicted in scenario 1 with a router (B).

Again, several congestion control mechanisms were considered for sources, including: link level backpressure, Implicit congestion control based on Frame-ACK timing and explicit congestion control based on FECN. Of the several forms of congestion control mechanisms considered, SAN Fabric sources must implement the explicit congestion control approach. The following describes how explicit congestion control works under scenario 3. It will also describe the difficulties with the implicit congestion control approach that was considered.

Use explicit congestion detection by means of FECN back to the source and use slow start with multiplicative decrease.

Under this approach, when HOL blocking at switch A occurs, the switch detects congestion and marks flits with an FECN on just the send ports that have detected Normal Congestion. Assuming the flows are a result of long lived workload patterns, the links that are responsible for the congestion will get a FECN before links that are not responsible congestion. As a result, the flows that are responsible for congestion will get their injection rates reduced before those that are not. For example, if congestion occurs at router B due to a high send rate from host A, then the switch will forward a FECN to router B. Router B will return the FECN to host A through a No-Op frame. Host A will lower its injection rates and the local fabric will recover from the congestion.

Use implicit congestion detection by means of Frame-to-ACK timing and use slow-start and multiplicative decrease to respond to congestion.

Under this approach, if router B becomes congested it will quickly (through the link level back pressure) cause switch A to become congested.

Static injection rate control. If router B is part of a private network that is well managed, such that host A can determine all SAN Fabric and non-SAN Fabric link bandwidths per flow, then host A can adjust the injection rate so as to not exceed the lowest link bandwidth in use for each flow over the private network. This approach requires: tight private network topology; and the ability for management software to extract the lowest bandwidth link for a flow within the private network's topology. Given these abilities, the management software can set the injection rates for a source-destination flow that traverse the private network. However, this approach is very complicated, but more importantly it is ineffective at preventing congestion in the local fabric, because the private network may get congested due to traffic from other clients and hosts sharing the private network. If router B is a router tied to the internet, the situation becomes more exasperated.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A distributed computer system comprising:
   links; and
   end stations coupled between the links, wherein types of end stations include endnodes which originate or consume frames and routing devices which route frames between the links and do not originate or consume frames, wherein the end stations include a first source endnode which originates frames at a variable injection rate, wherein the first source endnode includes:
   a congestion control mechanism responding to detected congestion by multiplicatively decreasing the variable injection rate,
   wherein the variable injection rate (IR) is multiplicatively decreased according to $IR(i+1)=IR(i)*1/F1$, wherein F1 is a constant, wherein $IR(i)$ is equal to a previous variable injection rate and $IR(i+1)$ is equal to a new variable injection rate.

2. The distributed computer system of claim 1 wherein the congestion control mechanism responds to detected subsiding of congestion by multiplicatively increasing the variable injection rate.

3. The distributed computer system of claim 2 wherein the variable injection rate (IR) is multiplicatively increased according to $IR(i+1)=IR(i)*F2$, wherein F2 is a constant.

4. The distributed computer system of claim 1 wherein the end stations include a first destination endnode which consumes frames originated from the first source endnode, wherein the first destination endnode includes:
   a congestion control mechanism detecting congestion on a path the frames route from the first source endnode to the first destination endnode.

5. The distributed computer system of claim 4 wherein the first destination endnode's congestion control mechanism detects congestion based on Forward Explicit Congestion Notification (FECN) conditions, and forwards the FECN conditions to the first source endnode.

6. The distributed computer system of claim 1 wherein the end stations include a first destination endnode which consumes frames originated from the first source endnode, wherein the first source endnode's congestion control mechanism detects congestion on a path the frames route from the first source endnode to the first destination endnode by monitoring a previous variable injection rate and a round trip time for a frame to reach the first destination endnode and an acknowledgement (ACK) for the frame from the first destination endnode to reach the first source endnode.

7. The distributed computer system of claim 1 wherein the first source endnode's congestion control mechanism detects congestion on a path the frames route from the first source endnode by monitoring acknowledgement (ACK) timeouts.

8. The distributed computer system of claim 1 wherein at least one routing device includes:
   a congestion control mechanism detecting congestion on a path the frames route through the at least one routing device.

9. The distributed computer system of claim 8 wherein the at least one routing device includes receive and send port resources, and wherein the at least one routing device's congestion control mechanism detects congestion by analyzing the receive and send port resources.

10. Previously Presented) The distributed computer system of claim 1 wherein at least one routing device includes:
    a congestion control mechanism responding to detected congestion by dropping frames that are marked droppable for a time period.

11. The distributed computer system of claim 1 wherein at least one routing device includes:
    a congestion control mechanism responding to detected congestion by applying link back pressure by reducing a number of credits available for routing frames though the routing device from a link.

12. A method of controlling congestion in a distributed computer system having links and end stations coupled between the links, wherein types of end stations include endnodes which originate or consume frames and routing devices which route frames between the links and do not originate or consume frames, the method comprising:
    originating, from a first source endnode, frames at a variable injection rate;

detecting congestion; and multiplicatively decreasing the variable injection rate in response to the detected congestion including multiplicatively decreasing the variable injection rate (IR) according to IR(i+1)=IR(i)*1/F1, wherein F1 is a constant, wherein IR(i) is equal to a previous variable injection rate and IR(i+1) is equal to a new variable injection rate.

13. The method of claim 12 further comprising detecting subsiding of congestion; and multiplicatively increasing the variable injection rate in response to the detected subsiding of congestion.

14. The method of claim 13 wherein multiplicatively increasing the variable injection rate includes multiplicatively increasing the variable injection rate (IR) according to IR(i+1)=IR(i)*F2, wherein F2 is a constant.

15. The method of claim 12 further comprising:

consuming, at a first destination endnode, frames originated from the first source endnode; and detecting congestion on a path the frames route from the first source endnode to the first destination endnode.

16. The method of claim 15 wherein the detecting congestion on the path the frames route from the first source endnode to the first destination endnode includes detecting congestion based on Forward Explicit Congestion Notification (FECN) conditions, and the method further comprises:

forwarding the FECN conditions to the first source endnode.

17. The method of claim 12 further comprising:

consuming; at a first destination endnode, frames originated from the first source endnode; and detecting congestion on a path the frames route from the first source endnode to the first destination endnode by monitoring a previous variable injection rate and a round trip time for a frame to reach the first destination endnode and an acknowledgement (ACK) for the frame from the first destination endnode to reach the first source endnode.

18. The method of claim 12 wherein the detecting includes detecting congestion on a path the frames route from the first source endnode by monitoring acknowledgement (ACK) timeouts.

19. The method of claim 12 further comprising:

detecting congestion on a path the frames route through the at least one routing device.

20. The method of claim 19 wherein the at least one routing device includes receive and send port resources, and the detecting congestion on a path the frames route through the at least one routing device includes analyzing the receive and send port resources.

21. The method of claim 12 further comprising:

dropping frames that are marked droppable for a time period in response to the detected congestion.

22. The method of claim 12 further comprising:

applying link back pressure by reducing a number of credits available for routing frames though the routing device from a link in response to the detected congestion.

23. A distributed computer system comprising:

links; and end stations coupled between the links, wherein types of end stations include endnodes which originate or consume frames and routing devices which route frames between the links and do not originate or consume frames, wherein the end stations include a first source endnode which originates frames at a variable injection rate, wherein at least one routing device includes a congestion control mechanism responding to detected congestion by dropping frames that are marked droppable for a time period, and wherein the first source endnode includes:

a congestion control mechanism responding to detected congestion by multiplicatively decreasing the variable injection rate and responding to detected subsiding of congestion by multiplicatively increasing the variable injection rate, wherein the variable injection rate (IR) is multiplicatively decreased according to IR(i+1)=IR(i)*1/F1, wherein F1 is a constant, wherein the variable injection rate (IR) is multiplicatively increased according to IR(i+1)=IR(i)*F2, wherein F2 is a constant, wherein IR(i) is equal to a previous variable injection rate and IR(i+1) is equal to a new variable injection rate.

* * * * *